United States Patent

Hontz

[11] Patent Number: 5,907,550
[45] Date of Patent: May 25, 1999

[54] NETWORK PAGING GATEWAY

[75] Inventor: Steven M. Hontz, Peoria, Ariz.

[73] Assignee: TekNow, Inc., Phoenix, Ariz.

[21] Appl. No.: 08/709,619

[22] Filed: Sep. 9, 1996

[51] Int. Cl.$^6$ .............................. H04L 12/28; H04L 12/56
[52] U.S. Cl. ........................ 370/389; 370/467; 455/456; 340/825.44
[58] Field of Search ..................................... 370/389, 482, 370/392, 352, 355, 356, 465, 466, 467; 455/426, 445, 458, 456; 340/825.44

[56] References Cited

U.S. PATENT DOCUMENTS

| | | | |
|---|---|---|---|
| 5,438,326 | 8/1995 | Gorden | 340/825.44 |
| 5,677,909 | 10/1997 | Heide | 370/347 |
| 5,740,538 | 4/1998 | Joyce et al. | 455/456 |

*Primary Examiner*—Chi H. Pham
*Assistant Examiner*—Steven Nguyen
*Attorney, Agent, or Firm*—Michael A. Lechter; James H. Phillips; Squire, Sanders & Dempsey L.L.P.

[57] ABSTRACT

In order to interface diverging paging networks, a gateway is established which includes a rules engine for applying rules to received packets. Each rule includes matching, modifying and routing elements for identifying and handling received paging packets. When a packet is received, it is first determined if the packet is matched to a first, matching element of one of a set of previously established rules. If, the packet is matched to the first element of a given rule, it is modified in accordance with the second element of the given rule and forwarded in accordance with the third element of the given rule. However, if the received packet is not matched to a matching element of any of the rules, a default rule is applied during the modification and forwarding procedures. User invokable procedures are provided by which rules can be modified or new rules can be added. Optionally, a first set of aspects of each received packet are monitored and stored in a database for billing and like historical purposes, and a second set of aspects are logged in real time to provide ongoing performance and activity evaluation.

19 Claims, 42 Drawing Sheets

NPG active.npg

File　Edit　View　Operation　Window　Help

Ports

| Ports | Description | Connection | Backup port |
|---|---|---|---|
| 1 | Quik-E-Page - Phoenix trunk | Direct | 7 |
| 2 | 1st National Paging - Dallas Primary | Direct | 3,8 |
| 3 | 1st National Paging - Dallas Secondary | Direct | 2,8 |
| 4 | 1st National Paging - Fargo | Direct | 2,8 |
| 5 | Dial-out to Lonely Paging Co. | Dial-Out | |
| 6 | Dial-in backup line | Dial-In | |
| 7 | Dial-out backup for Quik-E-Page | Dial-Out | |
| 8 | Dial-out backup for 1st National | Dial-Out | |

Carriers

| Carrier | Description | Port | Node Address |
|---|---|---|---|
| 1 | Quik-E-Page | 1 | 1112,1120 |
| 2 | Lonely Paging Company | 5 | 1928 |
| 3 | 1st National Paging | 2-4 | 2400,5200,3700 |

Rules

| Rule | Description |
|---|---|
| 1 | Accept pages from Quik-E-Page, route to all |
| 2 | Block incoming pages from address 1928 |
| 3 | Modify pages from 1st National (Dallas), route to Quik-E-Page |
| Default | Discard any other packets |

For Help press F1

FIG. 2

| Event Viewer - Application Log on \\DILBERT | | | | | | |
|---|---|---|---|---|---|---|
| Log View Options Help | | | | | | |
| Date | Time | Source | Category | Event | User | Computer |
| 6/25/96 | 5:01:11 PM | NPG | Status | 201 | N/A | DILBERT |
| 6/25/96 | 5:00:29 PM | NPG | Ports | 704 | N/A | DILBERT |
| 6/25/96 | 5:00:29 PM | NPG | Status | 200 | N/A | DILBERT |
| 6/25/96 | 5:00:25 PM | NPG | Status | 201 | N/A | DILBERT |
| 6/25/96 | 5:00:06 PM | NPG | Ports | 704 | N/A | DILBERT |
| 6/25/96 | 5:00:06 PM | NPG | Status | 200 | N/A | DILBERT |
| 6/25/96 | 5:00:01 PM | NPG | Status | 201 | N/A | DILBERT |
| 6/25/96 | 4:59:22 PM | NPG | Ports | 704 | N/A | DILBERT |
| 6/25/96 | 4:59:22 PM | NPG | Status | 200 | N/A | DILBERT |
| 6/25/96 | 4:58:52 PM | NPG | Status | 201 | N/A | DILBERT |
| 6/25/96 | 4:58:08 PM | NPG | Ports | 704 | N/A | DILBERT |
| 6/25/96 | 4:58:08 PM | NPG | Status | 200 | N/A | DILBERT |
| 6/25/96 | 4:58:04 PM | NPG | Status | 201 | N/A | DILBERT |
| 6/25/96 | 4:57:33 PM | NPG | Ports | 704 | N/A | DILBERT |
| 6/25/96 | 4:57:33 PM | NPG | Status | 200 | N/A | DILBERT |
| 6/25/96 | 4:57:30 PM | NPG | Status | 201 | N/A | DILBERT |
| 6/25/96 | 4:57:04 PM | NPG | Ports | 704 | N/A | DILBERT |
| 6/25/96 | 4:57:03 PM | NPG | Status | 200 | N/A | DILBERT |
| 6/25/96 | 4:57:00 PM | NPG | Status | 201 | N/A | DILBERT |
| 6/25/96 | 4:56:36 PM | NPG | Ports | 704 | N/A | DILBERT |
| 6/25/96 | 4:56:36 PM | NPG | Status | 200 | N/A | DILBERT |
| 6/25/96 | 4:56:32 PM | NPG | Status | 201 | N/A | DILBERT |
| 6/25/96 | 4:56:09 PM | NPG | Ports | 704 | N/A | DILBERT |
| 6/25/96 | 4:56:09 PM | NPG | Status | 200 | N/A | DILBERT |
| 6/25/96 | 4:56:05 PM | NPG | Status | 201 | N/A | DILBERT |
| 6/25/96 | 4:55:19 PM | SQLCTR60 | NONE | 8 | N/A | DILBERT |
| 6/25/96 | 4:55:19 PM | SQLCTR60 | NONE | 8 | N/A | DILBERT |
| 6/25/96 | 4:55:15 PM | SQLCTR60 | NONE | 8 | N/A | DILBERT |
| 6/25/96 | 4:55:07 PM | NPG | Ports | 704 | N/A | DILBERT |
| 6/25/96 | 4:55:06 PM | NPG | Status | 200 | N/A | DILBERT |

FIG. 3

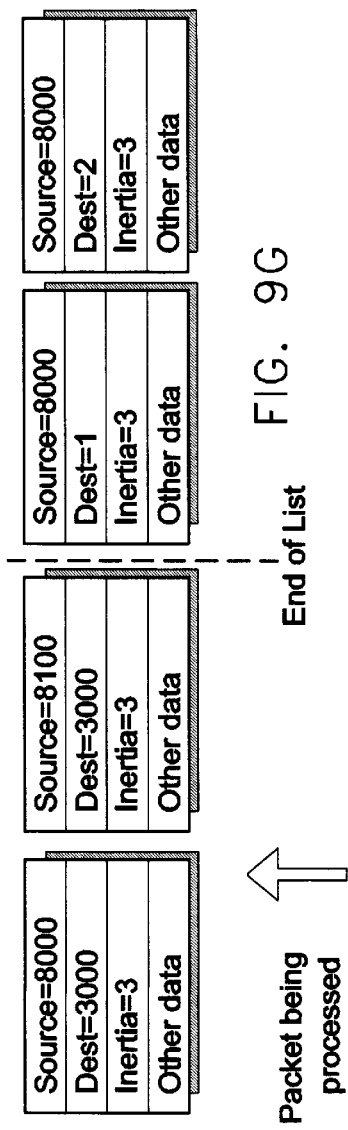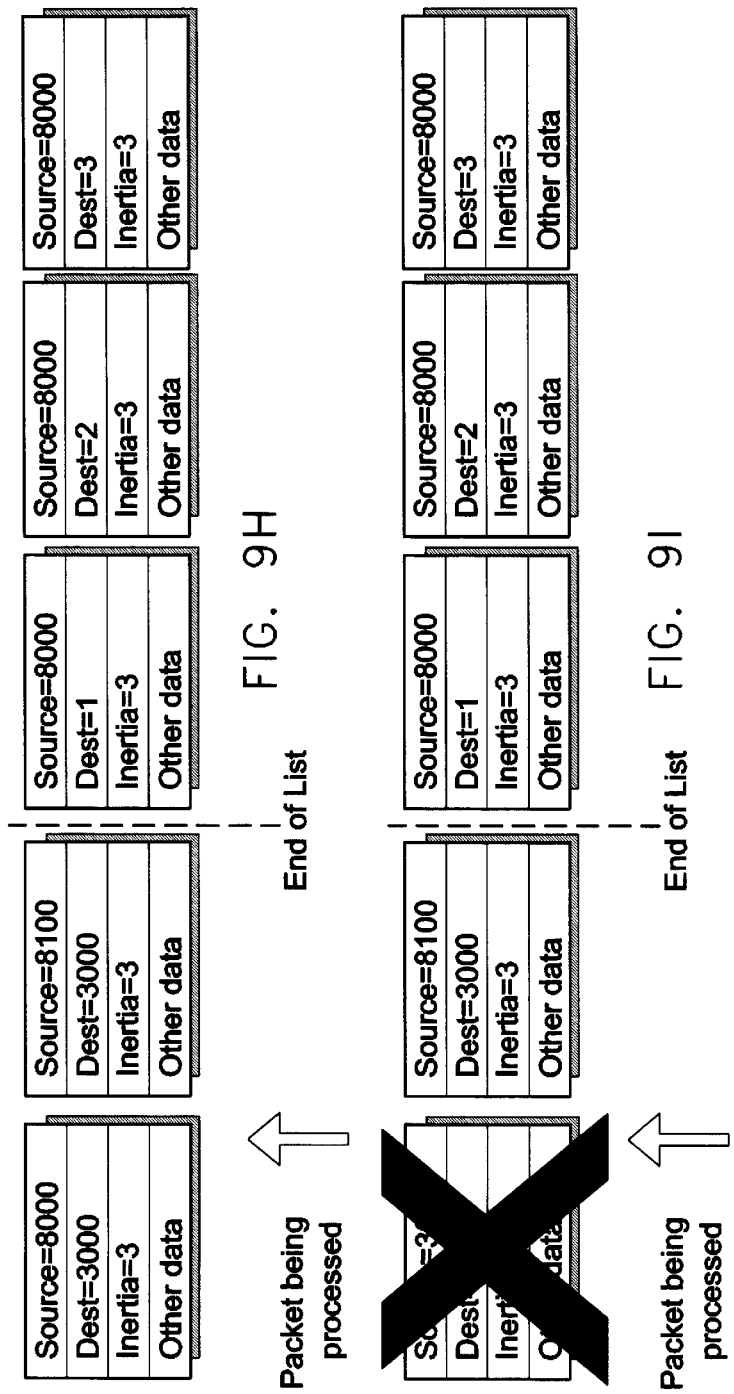
FIG. 9G  FIG. 9H  FIG. 9I

| Field | Description |
|---|---|
| Packet ID | A unique number assigned to each received packet for the purpose of tracking it throughout the NPG. |
| Sequence Number | Since a packet may contain more than one page, the sequence number indicates which page number this is out of this particular packet. |
| Spawned Sequence Number | The rules engine may convert a single inbound packet into multiple outbound packets. The spawned sequence number indicates which spawned packet (of the original packet) this is. |
| Timestamp | Each packet is marked with the date and time of either when it was received (for inbound packets) or when it was sent (for outbound packets). |
| Port Number | The port number the packet came in/went out on. |
| Protocol Type | Indicates what protocol the packet format is. The only protocol currently supported is TNPP. |
| Protocol Version | A number representing the version of the protocol used to process this packet. |
| Carrier ID | A number used to identify which carrier sent/received this packet. |
| Source Address | The TNPP source addess. |
| Destination Address | The TNPP destination address. |
| Inertia | The inertia value of the packet. |
| Datatype | Indicates the type of page this row contains: CAP page, ID page, etc. |
| Data Size | The size of the message portion of the packet. (The actual message data is not stored.) |
| Delivery Status | Null for inbound packets, 1 for successfully delivered, 2 - 7 for various "failed to deliver" status codes. |
| -additional fields- | The rest of the fields match the fields listed for the various data block types listed in the protocol specification. |

FIG. 11

| | |
|---|---|
| dogShow = location + {dog + owner}<br>location = city + state<br>dog = dogName + breed<br>owner = ownerName + phoneNumber<br>dogName, ownerName = name | A dog show consists of the location of the dog show and some number of dogs and owners. The location is defined as a certain city and state, and a dog is defined as having a name and a breed. An owner has a name and a phone number. dogName and ownerName are both just names. |

FIG. 12

| Field Name | Data Type | Limits | Example |
|---|---|---|---|
| breed | enum | Spaniel, Poodle, Mutt | Spaniel |
| city | text | 0 - 80 chars | "Scottsdale" |
| name | text | 0 - 20 chars | "Rex" |
| phoneNumber | numeric | 20 chars | 5551212 |
| state | text | 0 - 80 chars | "Arizona" |

FIG. 13

| | |
|---|---|
| configuration = npgConfig + networkConfig<br>  + rulesTable + addressTable +<br>  billingConfig + reportConfig +<br>  alarmConfig<br>npgConfig = npgNodeAddress + portConfig<br>addressTable = {addressTableEntry}<br>addressTableEntry = description +<br>  {tnppNodeAddress}<br>addressSpec = [tnppNodeAddress \|<br>  addressTableEntry] | The configuration entry in the model contains all the configuration information for the NPG. It includes the actual node address of the NPG. The address table is a way for the user to associate descriptive names with one or more TNPP addresses. The "addressSpec" entry is used later in the model, in places where a user can put in a physical node address or a descriptive address that is looked up in the addressTable. |

FIG. 14

| | |
|---|---|
| networkConfig = {node}<br>node = nodeIdentification + {connection}<br>nodeIdentification = carrierDescription +<br>  nodeDescription + {tnppNodeAddress}<br>carrierDescription, nodeDescription =<br>  description<br>connection = description + [<br>  directConnection \| dialinConnection \|<br>  dialoutConnection ]<br>directConnection = node<br>dialinConnection = ?<br>dialoutConnection = modemInitString +<br>  modemDialString | A network consists of some number of nodes. Each node has some number of connections to the other nodes, and those connections can be of various types. |

FIG. 15

| | |
|---|---|
| portConfig = {port} + {portPool} | The portConfig describes all the ports on the NPG. |
| port = portNumber + desription + protocolSetup + connectionSetup + backupPort + enabled | Each port can be individually enabled or disabled. If a dialup port is disabled, it should disable auto-answer. |
| protocolSetup = ["TNPP" + tnppProtocolConfig \| "WMTP"...] | A port has a specific protocol associated with it. |
| tnppProtocolConfig = dynamicTnppProtocolConfig + staticTnppProtocolConfig | tnppProtocolConfig contains the TNPP protocol-specific per port stuff. It is split into dynamic (changes during running) config and static (fixed during execution) config. |
| dynamicTnppProtocolConfig = serialNumber + serialNumberTable<br>serialNumberTable = {serialNumber} | Each port has a dynamic current serial number associated with it (for transmission) and a serial number table (for detecting duplicates on reception.) |
| staticTnppProtocolConfig = tnppDestinationNodes + timeouts + retryCounts + serialNumberTableMaxNumberOfEntries + tnppPacketSize + crcTransparencyEnabled | Each port has static tunable TNPP configuration timeouts and retries. Thus, if some of the connected nodes have different timeout or retry characteristics (for example, if they are dialup nodes) the parameters can be individually tuned for that node. |
| tnppDestinationNodes = {addressSpec}<br>timeouts = interCharacterTimeout + responseTimeoutWithIdleReceiver + responseTimeoutWithBusyReceiver + responseTimeoutOnENQ + rsFlagHoldOffTime + keepAliveTimeout<br>retryCounts = senderRetriesPerPacket + rsRetransmissionRetries + EnqRetriesportConfiguration = [serialPortSetup \| LANportSetup] | Each port has some number of TNPP destination node addresses associated with it. This allows the user to select the "Route based on destination address" option in routing rules, and have the packet go to the appropriate port associated with the destination address. |

FIG. 16A

| | |
|---|---|
| connectionSetup = {["Serial" + serialPortConfig \| "LAN" + lanConfig] | Each port has a connection setup specifying whether it is a serial port or a LAN port. |
| serialPortConfig = comPort + baudRate + flowControl + modeSetup<br>flowControl = ["None" \| "Xon/Xoff" \| "RTS/CTS" \| "DTR/DSR" ]<br>modeSetup = ["Direct" \| "DialIn" + dialInConfig \| "DialOut" + dialOutConfig ]<br>dialInConfig = modemInitString + enableAutoAnswerString + disableAutoAnswerString + inboundDisconnectConfig<br>inboundDisconnectConfig = ["Never disconnect" \| "Disconnect when link is idle for x seconds" + seconds To Wait]<br>dialOutConfig = modemInitString + modemDialString + originateConfig + phoneNumberConfig + outboundDisconnectConfig<br>originateConfig = ["Establish connection at startup" \| "Establish connection on demand"]<br>phoneNumberConfig = ["Use phone number supplied by rule" \| "Use specific phone number" + phoneNumber] + backupPhoneNumber<br>outboundDisconnectConfig = ["Never disconnect" \| "Disconnect when queue is empty" \| "Disconnect when idle for x seconds" + secondsToWait]<br>lanConfig = ...[TBD]... | Each serial port has some configuration information.<br><br><br><br><br><br><br><br><br><br><br><br><br><br><br><br><br><br><br><br><br><br>A LAN port has some configuration information associated with it. |
| portPool = description + {port} | A portPool allows the gateway to dynamically determine which port in a pool it should send a packet to, based on queue lengths. etc. |

FIG. 16B

| | |
|---|---|
| rcvdPaacket = rcvdPacketInfo + rcvdPacketData | The rcvdPacketInfo includes essential information about the packet: what port it came in on, when it was received, a unique number for identifying the packet, and what protocol the packet is in (since we can support multiple protocols). |
| rcvdPacketInfo = port + date + time + packetIdNumber + prootcolInfo<br>rcvdPacketData = [tnppPacket \| wmtpPacket \| ...] | The packetIdNumber increments for every packet received, so no two packets in the system will have the same id number. (This is useful for putting together multiple pages into one packet on the outbound side.) |
| protocolInfo = protocolType + protocolVersion<br>protocolType = ["TNPP" \| "WMTP" \| ...] | ProtocolVersion is used to indicate which version of the protocol this packet was received with. This provides a means for identifying changes in a packet structure between protocol versions. |

FIG. 17

| | |
|---|---|
| tnppPacket = header + {dataBlock}<br>header = sourceAddr + destAddr + inertia +<br>   serialNumber + (headerExtension)<br>sourceAddr, destAddr = tnppNodeAddress | Note that a single TNPP packet can contain multiple data blocks. This could be multiple cap pages, mulitple ete blocks, etc., or mixtures of these data block types. |
| dataBlock = [eteBlock \| pageBlock \|<br>   commandBlock \| userDataBLock \|<br>   stauseBlock]<br>eteBlock = [eteRequestBlock \|<br>   eteResponseBlock]<br>eteRequestBlock = blockType + eteIdentifier +<br>   otherBlock<br>blockType = ["ETE Request" \| "ETE<br>   Response" \| "CAP Page" \| "ID Page" \|<br>   "Command" \| "Data" \| "Status" \| "Extended<br>   CAP Page"]<br>eteResponseBlock = blockType + eteIdentifier<br>   + responseCode + rejectCode<br>otherBlock = [pageBlock \| commandBlock \|<br>   userDataBlock \| statusBlock]<br>pageBlock = [capPageBlock \| idPageBlock \|<br>   extendedCapPageBlock]<br>capPageBlock = blockType + pageType +<br>   pageClass + channel + zone +<br>   functionCode + capcode + message<br>idPageBlock = blockType + functionCode +<br>   identifier + message<br>extendedCapPageBlock = blockType +<br>   pageType + pageClass + channel + zone +<br>   functionCode + priority + capcode +<br>   msgSequenceNumber + message<br>commandBlock = blockType +<br>   manufacturerCode + command +<br>   {commandParameters}<br>userDataBlcok = blockType + {userData}<br>statusBlock = blockType + statusCode +<br>   priority + errorCode + date + time +<br>   ({text}) | Even though multiple data blocks may occur in a single TNPP packet, the NPG treats them as though they came in separate packets. (See the section on virtual packets.) Thus, the user can think of the routing rules as applying to each individual data block as though they were separate packets. |

FIG. 18

| | |
|---|---|
| virtualPacket = rcvdPacketInfo + virtualPacketInfo + virtualPacketData<br>virtualPacketInfo = datablockNumber + totalNumberOfDataBlocks | The rcvePacketInfo is the same as listed in the Received Packet Information section. Here, two additional pieces of inforamtion are added: which block number this particular packet was (datablockNumber) out of the total number of data blocks in this packet (totalNumberOfDataBlocks). |
| virtualPacketData = [singleTnppPacket \| singleWmtpPacket...]<br>singleTnppPacket = header + dataBlock | Note that a single TnppPacket is the same as a tnppPacket (defined in the TNPP Packet section) with the exception that there is only one data block. |

FIG. 19

| | |
|---|---|
| rulesTable = {matchConditions + modifications + routing + enabled} + defaultRule | The rulesTable consists of many rules. Each rule has conditions to be matched that, if met, indicate that, yes, this is the rule to use, then the modifications to make to the packet when applying the rule, and, finally, what routing to apply to the packet. |
| defaultRule = modifications + routing | If no rules match, the defaultRule is used.<br>The enabled flag is used to enable/disable a specific rule. |

FIG. 20

| | |
|---|---|
| matchConditions = description + <br>   packetMatchConditions + <br>   dataBlockMatchConditions <br>packetMatchConditions = (byPort) + <br>   (bySource) + (byDest) <br>byPort = port <br>bySource = {addressSpec} <br>byDest = {addressSpec} | The matching conditions allow performing matching procedures based on fields in the TNPP packet header itself, or on the data blocks contained within the TNPP packet. |
| dataBlockMatchConditions = [ <br>   byEteRequest \| byEteResponse \| <br>   byCapPage \| byIdPage \| byCommand \| <br>   byData \| byStatus \| byExtendedCapPage] | If multiple matching conditions are selected, they are treated as a logical AND. Thus, if a port and a specific source address are specified, both conditions must be meet before the rest of the rule is executed. |
| byCapPage = (byPageType) + <br>   (byPageClass) + (byChannel) + <br>   (byZone) + (byFunctionCode) + <br>   (byCapCode) + (byMessageLen) <br>byPageType = {pageType} <br>byPageClass = {pageClass} <br>byChannel = {channelNumber} <br>byZone = {zoneNumber} <br>byFunctionCode = {functionCode} <br>byCapCode = {capCode} <br>byMessageLength = maxLengthAllowed <br>-others- to be decided (TBD) | The byCapPage conditons permit the selection of particular types of pages that may be of interest. For example, a rule that matches all POCSAG 1200 baud pages can be set up. |

FIG. 21

| | |
|---|---|
| modifications = description +<br>   packetModifications +<br>   dataBlockModifications<br>packetModifications = (modifySource) +<br>   (modifyDest) + (modifyInertia)<br>modifySource = [{addressSpec} \|<br>   npgNodeAddress}<br>modifyDest = {addressSpec}<br>modifyInertia = ["Normal (decrement by<br>   1)" \| "No change" \| "Increment by 1"<br>   \| "Set to value" + value]<br>dataBlockModifications = [<br>   eteRequestMods \| eteResponseMods \|<br>   capPageMods \| idPageMods \|<br>   commandMods \| dataMods \|<br>   statusMods \| extendedCapPageMods]<br>capPageMods = (pageTypeMod) +<br>   (pageClassMod) + (channelMod) +<br>   (zoneMod) + (functionCodeMod) +<br>   (capCodeMod) + (lengthMod)<br>pageTypeMod = pageType<br>pageClassMod = pageClass<br>channelMod = channelNumber<br>zoneMod = zoneNumber<br>functionCodeMod = functionCode<br>capCodeMod = capcode | Modifications operate similar to matchingConditions, in that they are ANDed together when more than one are applied. Thus, if it is desired to modify the source address and modify the inertia, both modifications will be carried out on the packet that met the matching conditions.<br>The source address can be modified to be the NPG node address (npgNodeAddress). Note that the modifySource and modifyDest entries indicate that there can be multiple source or destination addresses. This means that a particular packet on the input side can be matched and turned into multiple output packets. The inertia value is normally decremented by 1 (as dictated by the TNPP spec). However, there may be cases where this is not the desired behavior, so the user is allowed to pick other options. |
| lengthMod = ["Truncate to max length" \|<br>   "Break into multiple pages of max length<br>   each"] + maxLengthAllowed | Note that excessively long packets can be either truncated (chopped off) broken into multiple pages. |

FIG. 22

| | |
|---|---|
| routing = description + ["Discard" \| routingMethod ]<br>routingMethod = ["Route based on destination address" \| "Route to specific port(s)" + {port} \| "Route to port pool" + portPool \| "Route to dial out" + phoneNumber] + priorityScheme | Packets that were matched (and possibly modified) can either be discarded or sent out. (Discarded packets are still logged as a transaction, so the database can be queried for the discarded packets.) Packets that are to be sent out can be sent to the destination specified in the destination address in the packet, specific ports, to a dynamically balanced pool of ports, or to a dialout line. |
| priorityScheme = {fixedPriority \| timeOfDayPriority]<br>fixedPriority = ["Emergency" \| "High" \| "normal" \| "Low" \| "Overnight"]<br>timeOfDayPriority = {priorityTime}<br>priorityTime = startTime + endTime + fixedPriority | Packets can be assigned a priority which determines their place in the output queue. (The NPG will always try to send the highest priority packets first.) Priority levels can be assigned at a fixed level, or they can be assigned based on a certain time of day. |

FIG. 23

| | |
|---|---|
| databaseConfiguration = storePacketHeaderFlag + storePacketDataFlag + storeMessageFlag | The flags are used as follows: if storePacketHeaderFlag is TRUE, then the TNPP header data is stored in the transaction; if storePacketDataFlag is TRUE, then the actual page parameters (capcode, page type, etc.) are stored; if the storeMessageFlag parameter is true, then the actual message is stored in the database. |

FIG. 24

| | |
|---|---|
| transactionLog = {receivedTransactions} + {discardedTransactions} + {sentTransactions} + {failedTransactions} <br> receivedTransactions, discardedTransactions, sentTransactions, failedTransactions = transaction | All packets received, discarded (due to a rule), successfully sent, and failed (attempted to send, but was rejected by receiveing node) are tracked. |
| transaction = requiredTransactionInfo + optionalTransactionInfo | Each transaction has a required part (always stored in the database) and an optional part. Which optional parts are actually stored are determined by databaseConfiguration. |
| requiredTransactionInfo = port + date + time + packetIdNumber + status <br> optionalTransactionInfo = (header) + (dataBlockInfo) + (message) | The status field indicates the status of the transaction: in the discardedTransaction database, for example, it would indicate the reason why the transaction was discarded. |
| dataBlockInfo = [pageBlockInfo \| otherBlockInfo] <br> pageBlockInfo = [capPageBlockInfo \| idPageBlockInfo \| extendedCapPageBlockInfo] <br> capPageBlockInfo = blockType + pageType + pageClass + channel + zone + functionCode + capcode <br> idPageBLockInfo = blockType + functionCode + identifier <br> extendedCapPageBlockInfo = blockType + pageType + pageClass + channel + zone + functionCode + priority + capcode + msgSequenceNumber <br> otherBlockInfo = [eteBlock \| commandBlock \| userDataBlock \| statusBlock] | The various xPageBlockInfo blocks are identical to the pageBlocks defined in the TNPP Packet section. |

FIG. 25

| Field Name | Data Type | Limits | Example |
|---|---|---|---|
| blockType | byte | Valid values are:<br>0x3C = ETE Response<br>0x3E = ETE Request<br>0x41 = CAP Page<br>0x42 = ID Page<br>0x43 = Command<br>0x44 = Data<br>0x45 = Status<br>0x46 = Extended CAP Page | 0x41 = CAP page |
| capcode | Field size (in bytes) varies based on pager type: FLEX is 13, ERMES is 12, all others are 8 | See the TNPP spec v 3.7 for limits and definitions per pager type | "00123456" |
| channelName | text | 1 - 80 characters | "Freq 1" |
| channelNumber | byte | 0x40 - 0x7F | |
| command | 3 bytes | 0x20 - 0x7F | |
| commandParameters | 0-999 bytes | Defined by each manufacturer, Only non-control characters are valid. | |
| date | | | |
| description | text | 0 - 80 characters | "Phoenix" |
| enabled | Boolean | True or False | True |
| errorCode | | | |
| eteIdentifier | 2 bytes | 0x40 - 0x7F | |
| functionCode | byte | 0x40 - 0x4F and 0x60 - 0x6F | |
| identifier | 10 bytes | This is a 10-byte ASCII field which is left justified. All unused characters should be filled with an ANSCII space. Valid values are:<br>0x20 - 0x7F | "1234567" |
| inertia | 2 bytes | two-hexadecimal-digit ASCII field. Valid values are 0 - 255 | 15 |
| logicalAddr | text | 1 - 80 characters | "Salt Lake City" |
| manufacturerCode | 3 bytes | This is a three-byte field. Valid values are 0x20 - 0x7F | "TEK" |
| matchDescription | text | ASCII text | "Match by destination" |
| message | text | 0x20 - 0xFE | "This is a message" |
| msgSequenceNumber | 2 bytes | | 12 |

FIG. 26A

| Field Name | Data Type | Limits | Example |
|---|---|---|---|
| nodeName | text byte | 1 - 80 characters | |
| pageClass | byte | Valid values are:<br>0x42 = Beep Only<br>0x4E = Numeric Dispaly<br>0x6E = Shifted Numeric<br>0x41 = Alphanumeric Display<br>0x56 = Voice<br>0x44 = Data<br>0x31 = Special Class 1<br>0x32 = Special Class 2<br>.<br>.<br>.<br>0x39 = Special Class 9 | 0x42 = Beep Only |
| pageType | text | Valid values are:<br>0x50 = POCSAG - 512 baud<br>0x70 = POCSAG - 1200 baud<br>0x51 = POCSAG - 2400 baud<br>0x47 = Golay Sequential Code<br>0x54 = Golay Type II-A<br>0x46 = FLEX<br>0x65 = ERMES<br>0x6E = NEC D2 Format<br>0x4E = NEC D3 Format<br>0x41 = APOC<br>0x48 = HSC<br>0x35 = 5/6 Tone<br>0x32 = 2 Tone<br>0x52 = RDS<br>0x4D = MBS<br>0x34 = Multitone - Mark IV<br>0x56 = Multitone - Mark V<br>0x36 = Multitone - Mark VI<br>0x53 = Spantel<br>0x44 = DTMF<br>0x64 = DTMF Networking<br>0x45 = Echo Format<br>0x5C = Newspager - 512 baud<br>0x7C = Newspager - 1200 baud<br>0x2E = Reserved | 0x51 = POCSAG - 2400 baud |
| portName | text | 1-80 characters | "Salt Lake City" |
| portNumber | byte | Physical port number | |
| priority | byte | See v 3.7 of the TNPP spec for interpretation | |

FIG. 26B

| Field Name | Data Type | Limits | Example |
|---|---|---|---|
| protocolType | byte | 0x00 = TNPP<br>0x01 = WMTP | 0x00 = TNPP |
| protocolVersion | byte | 0x01 - 0xff | 1 = first version of a protocol, 2 = second... |
| rejectCode | byte | Valid values are 0x40 - 0x7F<br>Currently defined reject codes are:<br>0x40 = No reject<br>0x41 = Media fail - full<br>0x42 = Incompatible data type<br>0x43 = Invalid segment number<br>0x44 = Incorrect block length<br>0x45 = Access barred<br>0x46 = Incompatible destination<br>0x47 = Destination out of order<br>0x48 = Remote procedure error<br>0x49 = No multi-block sequences allowed | |
| responseCode | byte | 0x40 - 0x7F | 0x77 = Multi-block OK, Reject, window = 7 |
| serialNumber | 2 bytes | two-hexadecimal-digit ASCII field. Valid values are: 1 - 255 (0 is reserved). | |
| statusCode | byte | Valid values are:<br>0x53 = error set<br>0x52 = error reset<br>0x50 = local priority change<br>0x45 = non-latched error | 0x53 = error set |
| text | text | ASCII text | "This is an error" |
| time | | | |
| tnppNodeAddress | 4 bytes | Each byte represents a hexadecimal value in ASCII. Valid address ranges is; 1-65535 (0 is reserved). | |
| translationDescription | text | ASCII text | "" |
| userData | 0-1000 bytes | Defined by each manufacturer. Only non-control characters are valid. | |
| zoneName | text | 1-80 characters | "Apache Junction" |
| zoneNumber | byte | 0x40 - 0x7F | |

FIG. 26C

| User Group | Permissions |
|---|---|
| NPG Administrators | Can do anything. The most powerful of all NPG users. |
| NPG Billing Administrators | Can edit billing configuration, generate billing reports. Can't configure or control the NPG. |
| NPG Billing Operators | Can generate billing reports. |
| NPG Operator | Can configure, start/stop the NPG. Can't do any billing activity. |

FIG. 27

| Role | Description | Tasks |
|---|---|---|
| Installer | This is a one-time (or seldom) done role. It is usually done when the system is first installed. | • Configure ports<br>• Configure addresses<br>• Configure alarms<br>• Print configuration |
| Administrator | This is the normal role a user of the NPG would play. | • Set up rules<br>• Print rules |
| Billing | This role involves setting up the billing reports for the NPG | • Configure billing reports<br>• Print billing reports |
| Monitor | The monitor is the person who is watching how well the NPG is performing. | • Examine event logs<br>• Examine performance |
| Technician | This is a trouble-shooting role. | • Simulate page<br>• Send test page |

FIG. 28

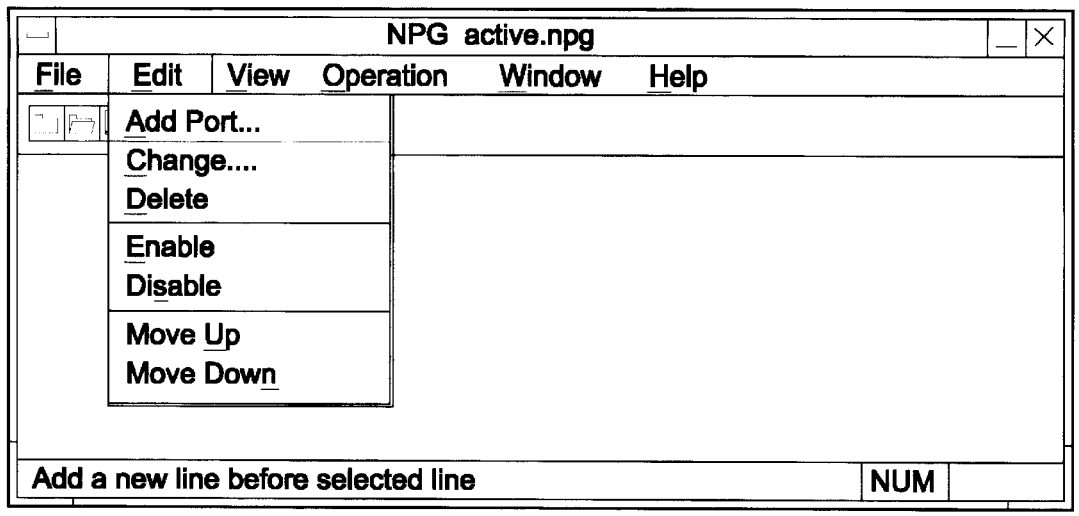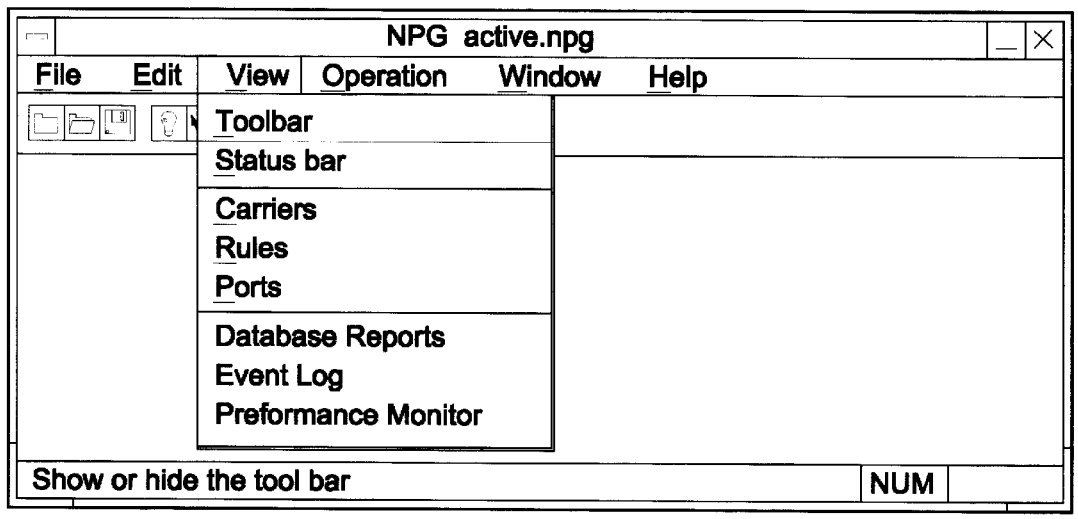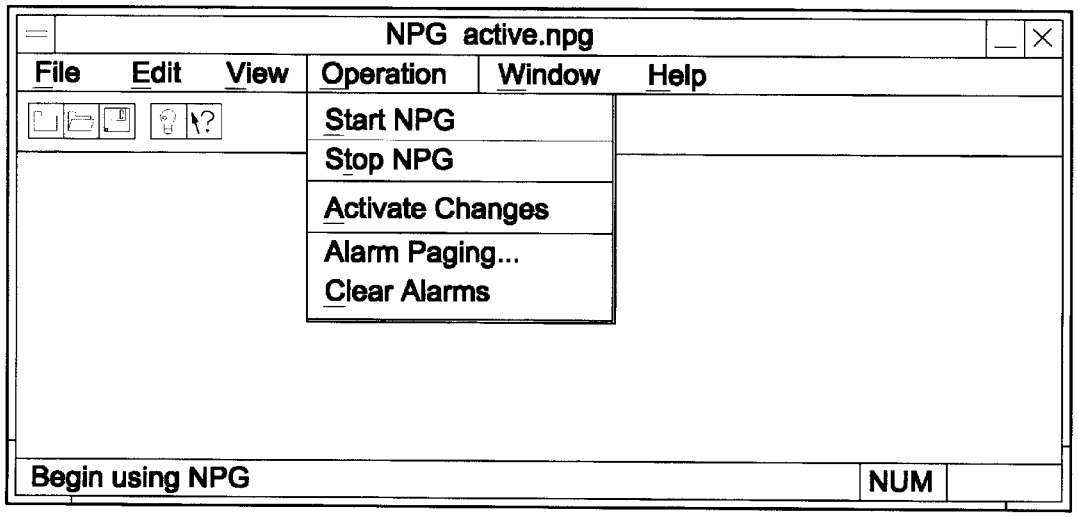
FIG. 30A

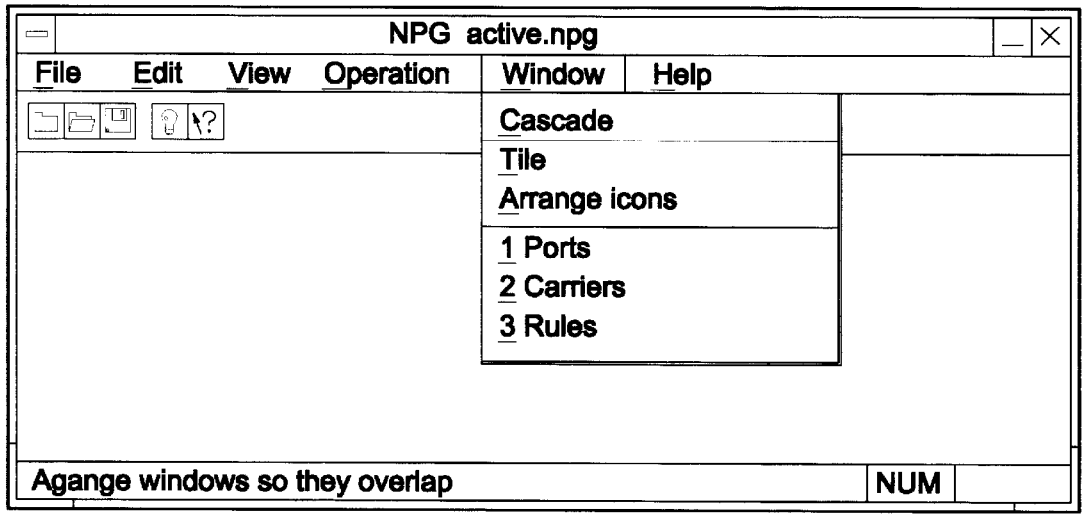
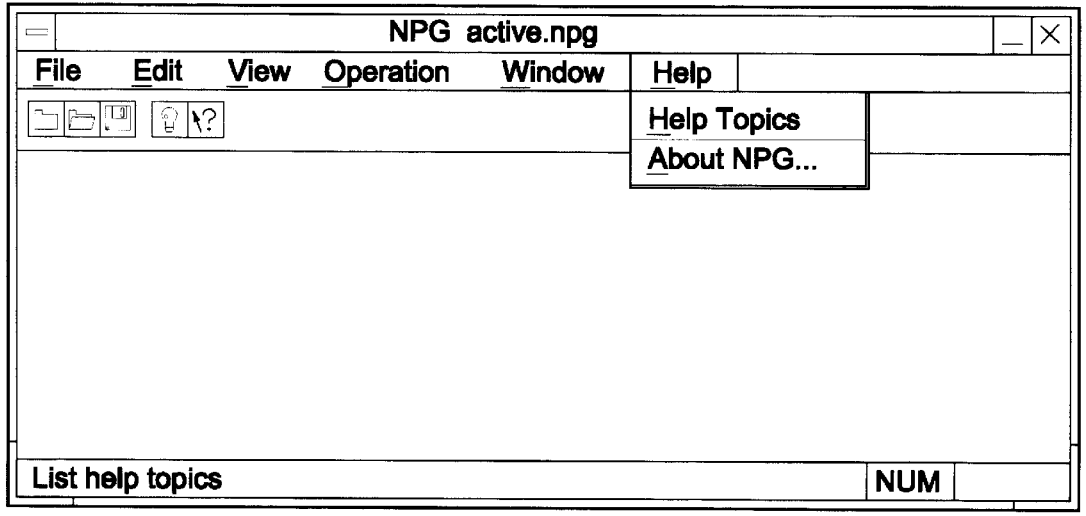
FIG. 30B

| | |
|---|---|
| Total packets received/sec | The total number of TNPP packets received per second. |
| Total packets received | The total number of TNPP packets received. |
| Total serial errors received | The total number of TNPP serial errors received. |
| Total packets sent/sec | The total number of TNPP packets sent per second. |
| Total packets sent | The total number of TNPP packets sent. |
| Total NAKs sent | The total number of NAKs sent in response to a received packet. |
| Total NAKs received | The total number of NAKs received in response to a transmitted packet. |
| Total CANs sent | The total number of CANs sent in response to a received packet. |
| Total CANs received | The total number of CANs received in response to a transmitted packet. |
| Total RSs sent | The total number of RSs sent in response to a received packet. |
| Total RSs received | The total number of RSs received in response to a transmitted packet. |
| %Rx Queue Capacity | This percentage represents system activity in receiving packets. The received queue has a limit on the number of packets that have been received and are waiting for processing. When packets fill this queue, the system is receiving packets faster than it can process them. |
| %Tx Queue Capacity | This percentage represents system activity in preparing packets for transmission. The transmitted queue has a limit on the number of packets waiting for transmission. When packets fill this queue, the system is preparing packets for transmission faster than the network can transmit them. |
| Packets received/sec | The number of TNPP packets received per second. |
| Packets received | The total number of TNPP packets received. |
| CRC errors received | The total number of CRC errors received. |
| Parity errors received | The total number of parity errors received. |
| Overrun errors received | The total number of overrun errors received. |
| Framing errors received | The total number of framing errors received. |
| Break errors received | The total number of break errors received. |
| Total errors received | The total number of communication errors received. |
| Packets sent/sec | The number of TNPP packets sent per second. |
| Packets sent | The number of TNPP packets sent. |
| NAKs sent | The total number of NAKs sent in response to a received packet. |
| NAKs received | The total number of NAKs received in response to a transmitted packet. |
| CANs sent | The total number of CANs sent in response to a received packet. |
| CANs received | The total number of CANs received in response to a transmitted packet. |
| RSs sent | The total number of RSs sent in response to a received packet. |
| RSs received | The total number of RSs received in response to a transmitted packet. |
| %database Queue Capacity | The capacity of the database queue. |

FIG. 39

NETWORK PAGING GATEWAY

FIELD OF THE INVENTION

This invention relates to the art of paging networks and, more particularly, to a system for seamlessly interfacing diverse paging networks and providing value added features.

BACKGROUND OF THE INVENTION

The ability to access individuals through small pagers has become a common business practice and is also widely used for personal reasons. As a result, a substantial industry has grown up which is directed to providing both pagers and a service for wireless communication to individual pagers for communicating messages. As the industry has expanded, the areas of coverage have correspondingly expanded, and it is often necessary to effect inter-carrier communications when it is desired to page an individual who may be, at that time, far removed from the direct wireless range of all the transmitters in the network of a carrier local to the page request.

Thus, two industry trends may be particularly noted. First, carriers are forming contractual relationships such that each carrier can use the other party's or parties' existing networks rather than build out duplicate infrastructure. Second, as with any dynamic industry, consolidation is taking place. In both cases, a need arises to efficiently and seamlessly interface diverse networks which have separately evolved. This is notoriously difficult to achieve, notwithstanding that identical protocols may be in use in networks to be interfaced, because the independent evolutions may, and often do, result, for example, in the existence of identical designations, which may even have different meanings. Merely by way of example, it is not unusual, when interfacing two paging networks, to find that identical node addresses are used and that they may not even have the same meaning.

In the past, this problem has been rather rigidly addressed by identifying all the potential address conflicts and the like between two carriers and then "hard wiring" an interface to resolve the identified conflicts. (With modem technology, the term "hard wiring", in this context, can be achieved by suitably programming a processor to perform table look up functions.) However, this task must be performed again for each newly established interface between carriers.

Thus, it will be readily apparent to those skilled in the art that it would be highly desirable to provide a system which can effortlessly and seamlessly interface a plurality of paging networks in a highly flexible fashion which includes not only rationalizing the differences between paging networks to be interfaced, but also provides numerous "value added" features.

OBJECTS OF THE INVENTION

It is therefore a broad object of this invention to provide an easily user configured gateway system to seamlessly interface between diverse paging networks and which may be easily reconfigured as requirements expand with, for example, the addition of one or more new paging networks.

It is another broad object of this invention to provide such a gateway system which is very flexible to readily resolve numerous differing conflicts that may be encountered while undertaking to interface a plurality of diverse paging networks.

It is a more specific object of this invention to provide a gateway which incorporates a rules based engine and in which rules can be easily defined and modified using a simple Graphical User Interface.

In another aspect, it is a broad object of this invention to provide a gateway which incorporates the ability to perform a variety of value added tasks on received packets before the modified packets are forwarded.

It is another, more particular, object of this invention to provide a gateway which incorporates a relational database facility to collect usage and performance information for billing, reports, statistical analysis and the like.

SUMMARY OF THE INVENTION

Briefly, these and other objects of the invention are achieved by establishing a set of rules, each rule including matching, modifying and routing elements, for identifying and handling received paging packets. When a packet is received, it is first determined if the packet is matched to a first, matching element of one of the set of previously established rules. If, the packet is matched to the first element of a given rule, it is modified in accordance with the second element of the given rule and forwarded in accordance with the third element of the given rule. However, if the received packet is not matched to a matching element of any of the set of previously established rules, a predetermined default rule is applied during the modification and forwarding procedures. Preferably, user invokable procedures are provided by which rules can be modified or new rules can be added after the initial set of rules has been established.

In the presently preferred embodiment, the set of rules is established in accordance with the Telocator Network Paging Protocol. In addition, according to the presently preferred embodiment, a first set of predetermined aspects of each received packet are monitored and stored in a database for billing and like historical purposes, and a second set of predetermined aspects are logged in real time to provide ongoing performance and activity evaluation.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 2 is an illustration of the main NPG user interface screen as employed in the presently preferred embodiment;

FIG. 3 shows an exemplary event log screen;

FIG. 11 shows the fields in an exemplary database which may be incorporated into the subject NPG system;

FIG. 12 is an elementary Information Model table used to explain the concept of using an Information Model to teach the invention;

FIG. 13 shows a simple data dictionary associated with the Information Model table shown in FIG. 12;

FIG. 14 is an Information Model table of the general configuration of the NPG;

FIG. 15 is an information Model table of the TNPP network topology, shown as an adjunct of the subject invention;

FIG. 16, constituting FIGS. 16A and 16B taken together, is an Information Model table of the port configuration of the NPG;

FIG. 17 is an Information Model table of the received packet information of the NPG;

FIG. 18 is an Information Model table of the TNPP packet as typically employed in the invention;

FIG. 19 is an Information Model table of the virtual packet feature of the invention;

FIG. 20 is an Information Model table of the rules table, at a high level, as used in the invention;

FIG. 21 is an Information Model table of the rules—matching conditions aspect of the invention;

FIG. 22 is an Information Model table of the rules—modifications aspect of the invention;

FIG. 23 is an Information Model table of the rules—routing aspect of the invention;

FIG. 24 is an Information Model table of the database transaction configuration as employed in the presently preferred embodiment;

FIG. 25 is an Information Model table of the database transactions as employed in the presently preferred embodiment;

FIG. 26, constituting FIGS. 26A, 26B and 26C taken together, is the data dictionary for the NPG in the presently preferred embodiment;

FIG. 27 is a table illustrating typical security levels that can be established in the NPG;

FIG. 28 is a table illustrating typical user roles and user tasks while operating the NPG;

FIGS. 30A/B show other drop-down menus in the main NPG window;

FIG. 39 is a rate and absolute counter table used in conjunction with performance monitoring in the presently preferred embodiment.

DESCRIPTION OF THE PREFERRED EMBODIMENT(S)

BACKGROUND INFORMATION

Figure 1:
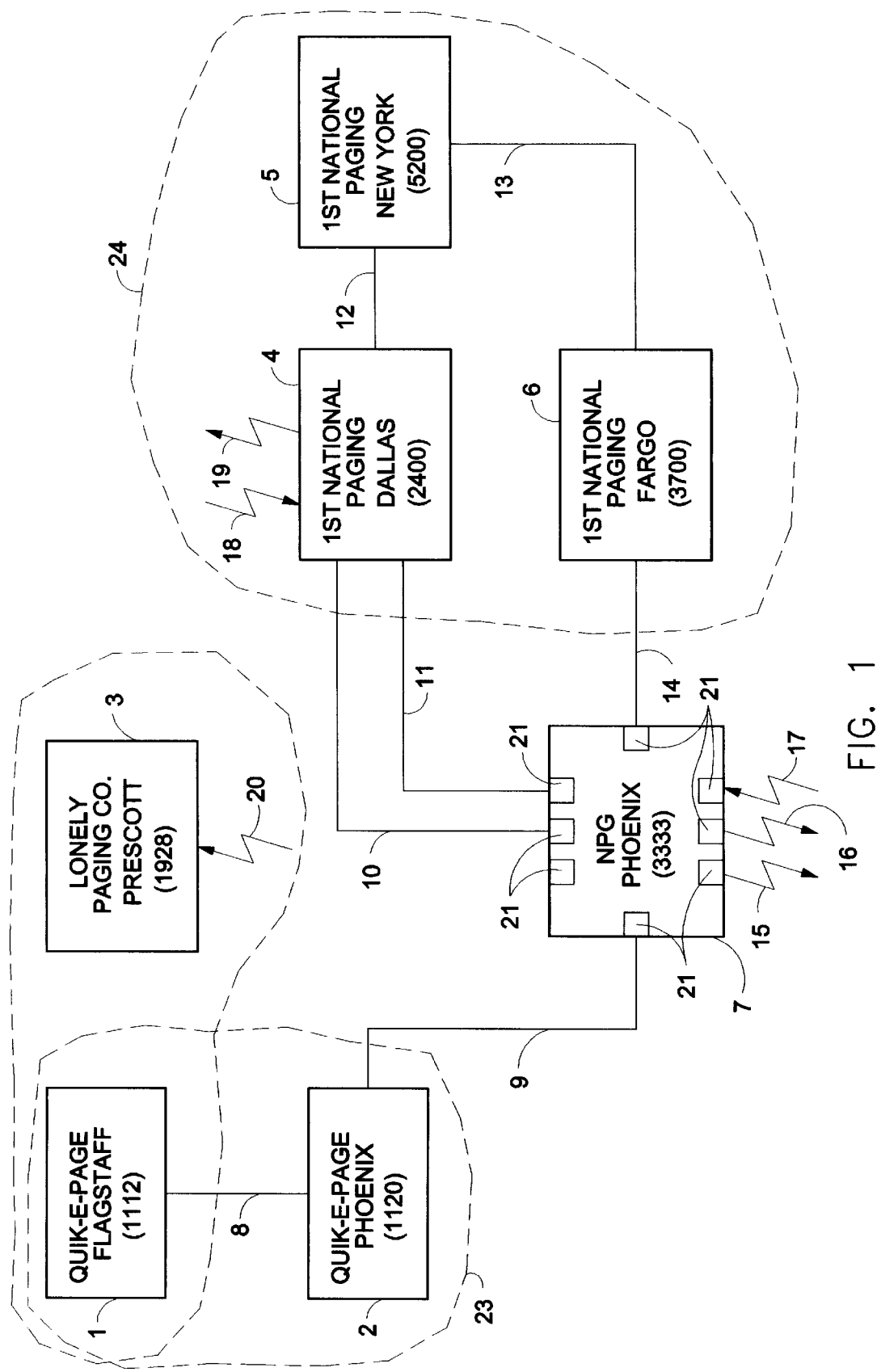
FIG. 1 is a high level block diagram of a multi-carrier network employing an NPG according to the present invention as a hub.

To provide some background knowledge of the problems that the present invention solves, reference may be taken to FIG. 1 which illustrates a paging network running under the TNP Protocol (hereinafter, "TNPP") and which incorporates a hub/router system according to the present invention. (The TNP protocol, as described in *Telocator Network Paging Protocol*—Version 3.7 of Jul. 27, 1995, TNPP Committee, c/o Real Tim Strategies, Inc., Hicksville N.Y., being hereby incorporated by reference—is selected for the example because it is the most widely used and is a de facto paging industry standard.) A TNPP network is used by paging companies to route paging traffic from one location (node) to another. The subject Network Paging Gateway™ (hereinafter, for convenience, NPG™) serves to efficiently route this traffic, based on rules configured by a user. Besides routing the data, the NPG also tracks all packet information in a relational database, allowing queries and billing reports to be generated against the traffic that the NPG has routed, and performs other operations as will become more evident below. FIG. 1 illustrates how several paging companies (carriers) can be connected together via the NPG (acting as a hub). Considering the exemplary FIG. 1 network in detail, it will be observed that the TNPP network consists of a plurality of nodes 1, 2, 3, 4, 5, 6 and an NPG unit 7 (which may also be considered a node). Each node belongs to a carrier (name shown in bold in the node blocks), has a location (shown beneath the name) and has a TNPP node address (shown in parentheses). TNPP nodes are hooked together via connections 9, 10, 11, 12, 13, 14, 15, 16, 17, 18, 19, 20.

There are characteristics to note about connections:

Nodes can have either full-time (always connected) or dialup (on-demand) connections. (Dial-out and dial-in lines are represented in FIG. 1 at connections 15, 16, 17, 18, 19, 20.) In the example, Lonely Paging Co.'s Prescott node 3 is used so seldom, it is only connected to the NPG 7 in Phoenix when the NPG has traffic to route to it. The NPG will initiate a call over the dialup connections 15, 20 to Prescott and terminate the call when done.

Other nodes in the network may have dial-out lines that can call into the Prescott node. 1st National Paging in Dallas has such a connection (e.g., 19) in FIG. 1.

Nodes can have more than one connection running between them and another node; e.g., the 1st National Paging node 4 in Dallas has two connections 10, 11 to the NPG 7 in Phoenix. The extra connections can be denoted in the NPG as either backup lines (only to be used if a primary line fails) or as a member of a group of connections tied to several ports called a port pool. The NPG dynamically balances the load across all the ports in a port pool.

There is often more than one way to reach a particular node in a network, and there may be, in fact, nodes that are linked together in a loop, as shown here (Phoenix/NPG 7-Dallas 4-New York 5-Fargo 6-and back to Phoenix/NPG 7).

The connections to the NPG 7 are made via ports 21 on the NPG. Ports on the NPG are configured by the NPG user for the kind of connection each supports (dedicated, dialup, primary, secondary, backup, etc.). The user can also set up routing rules based on the individual ports; e.g., all traffic from this port should go out that port. The port philosophy is an important concept on the NPG because ports are the interface to the network topology.

Finally, nodes can be thought of as being in groups 22, 23, 24 for the sake of statistics, routing, or billing purposes. Note the following about groups:

Groups are a logical concept, not a physical or geographical concept. Typically, though, it is desirable to group all nodes that belong to a particular carrier (the 1st National Paging group 24, for example).

Since groups are a logical concept, as many groups can be defined as may be convenient/useful.

A node can belong to more than one group (Quik-E-Page 1 in Flagstaff belongs to both the Quik-E-Page group 23 and to the Northern Arizona group 22).

Groups are merely a convenience to assist when configuring routing tables, statistics, reports, etc.

OVERVIEW

General

The NPG system is a hardware/software platform for routing TNPP packets. Typical hardware, at the current state-of-the-art, includes a Pentium®-based PC with Digiboard™ serial concentrators providing the TNPP ports. The software consists of the Microsoft Windows NT® operating system, Microsoft SQL Server™ as the database engine and special purpose NPG software according to the invention that handles the TNPP protocol and the manner in which packets are routed.

The NPG consists of the following components:
TNPP Protocol
Rules Engine
Database
Graphical User Interface
Event Logging
Performance Monitoring TNPP Protocol The TNPP protocol is implemented according to *Telocator Network Paging Protocol Specification*—v3.7, Jul. 27, 1995, TNPP Committee, c/o Real Time Strategies, Inc., Hicksville N.Y., incorporated herein by reference. The protocol is implemented as a finite state machine, which is a technique often used when programming communications protocols. The states, the events and the actions to take are all described in the TNPP specification. The TNPP code runs as two threads per port, one managing incoming data and one managing the state machine for the port. In the NPG, the TNPP code is compiled together with the rules engine code and runs as a Windows NT service. (A Windows NT service is an application that can run in the background, similar to a UNIX daemon, without requiring a user to be logged in.)

Rules Engine

The rules engine is the one of the key differentiating factors between the NPG and prior art systems. In the NPG, a user can set up any number of rules, via a user interface, and thereby cause the NPG to take different actions based on the packet data it receives. The rules engine is compiled together with the TNPP protocol. The rules engine is described in more detail below.

Database

Another differentiating factor between the NPG and prior art systems is the use of a relational database for storing historical packet information. Every field that exists in a TNPP packet (with the exception of the message data itself) is stored in the database, along with certain other information (such as the date/time the packet was received or sent, the port it came in on, etc.) By using a relational database, "interesting" queries can be generated at any time to obtain any kind of information the user wants. For example, a query can be generated a to ask "How many POCSAG pages were received from Carrier X between 8 AM and 5 PM?" The prior art schemes use fixed "buckets" to maintain statistics: number of packets received, number of Golay pages sent, etc. Because they do not store all the data, ad hoc queries such as the kind the NPG can answer cannot be generated. The database component will be discussed more fully below.

Graphical User Interface

The GUI feature of the NPG allows a user to easily custom configure his ports, how his carriers are defined and what rules to use when routing packets. This information is captured in a file, active.npg, that is used by the run-time engine to control its behavior. The GUI uses standard Windows NT controls to present an interface that will be familiar to anyone who has used a Windows program. FIG. 2 shows the main NPG user interface screen in the presently preferred embodiment.

Event Logging

Since the NPG runtime code runs as a service, with no user logged into the system, it needs a way to inform the user of "unusual" events—ports going down, serial port errors, etc. The NPG uses the Event Log feature provided with Windows NT to log events into an Application Event log. The user can then use the Event Log Viewer program (supplied with Windows NT) to view and manage the log data. FIG. 3 shows a sample event log screen as employed in the presently preferred embodiment.

Performance Monitoring

The NPG keeps track of performance data (number of packets received per second, total count of packets received, etc.) and makes them available to the user in the Windows NT Performance Monitor tool. This tool allows a user to view data in real-time in graphical or tabular form or to capture longterm log data for later analysis. It also allows the user to export the data in a format that can be read by other programs (such as Excel®). The Performance Monitoring feature of NPG will be discussed further below.

HIGH LEVEL ARCHITECTURE

The NPG serves as both a router and a gateway in TNPP networks. As a router, the NPG accepts TNPP packets and re-routes them into the TNPP network. A set of rules defines how the NPG does this. As a gateway, the NPG can accept TNPP packets, modify them and send them into the TNPP network, or it can accept packets in one protocol format and translate them into another protocol format (e.g., TNPP to WMTP).

Figure 4:
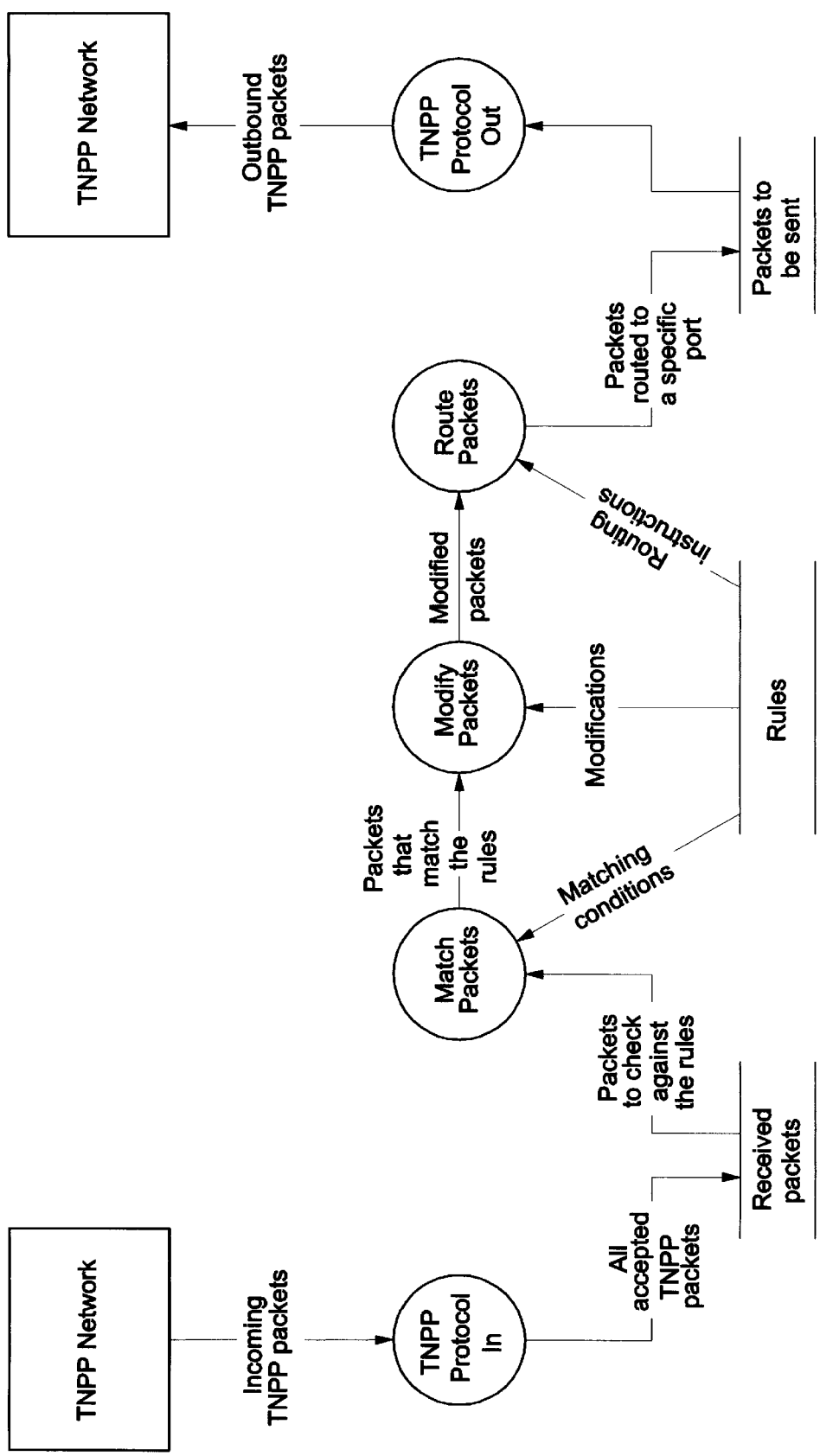
FIG. 4 is a depiction of the high level architecture of the NPG.

FIG. 4 illustrates the basic functionality of the NPG. Packets are received from the TNPP network and processed using the TNPP protocol. Once a packet has been properly received, the rules process begins. First, each packet (and the individual pages contained within it) is examined to determine if it meets any of the matching conditions in a rules table. If it does, then various modifications are applied as dictated by a modifications portion of the matched rule. Finally, the packet is routed to the appropriate output queue (based on a routing portion of the matched rule) where the TNPP output protocol sends it out to the TNPP network. (If no rules are matched, the NPG applies a default rule that specifies how a given packet is modified and routed.)

RULES ENGINE

Figure 5:
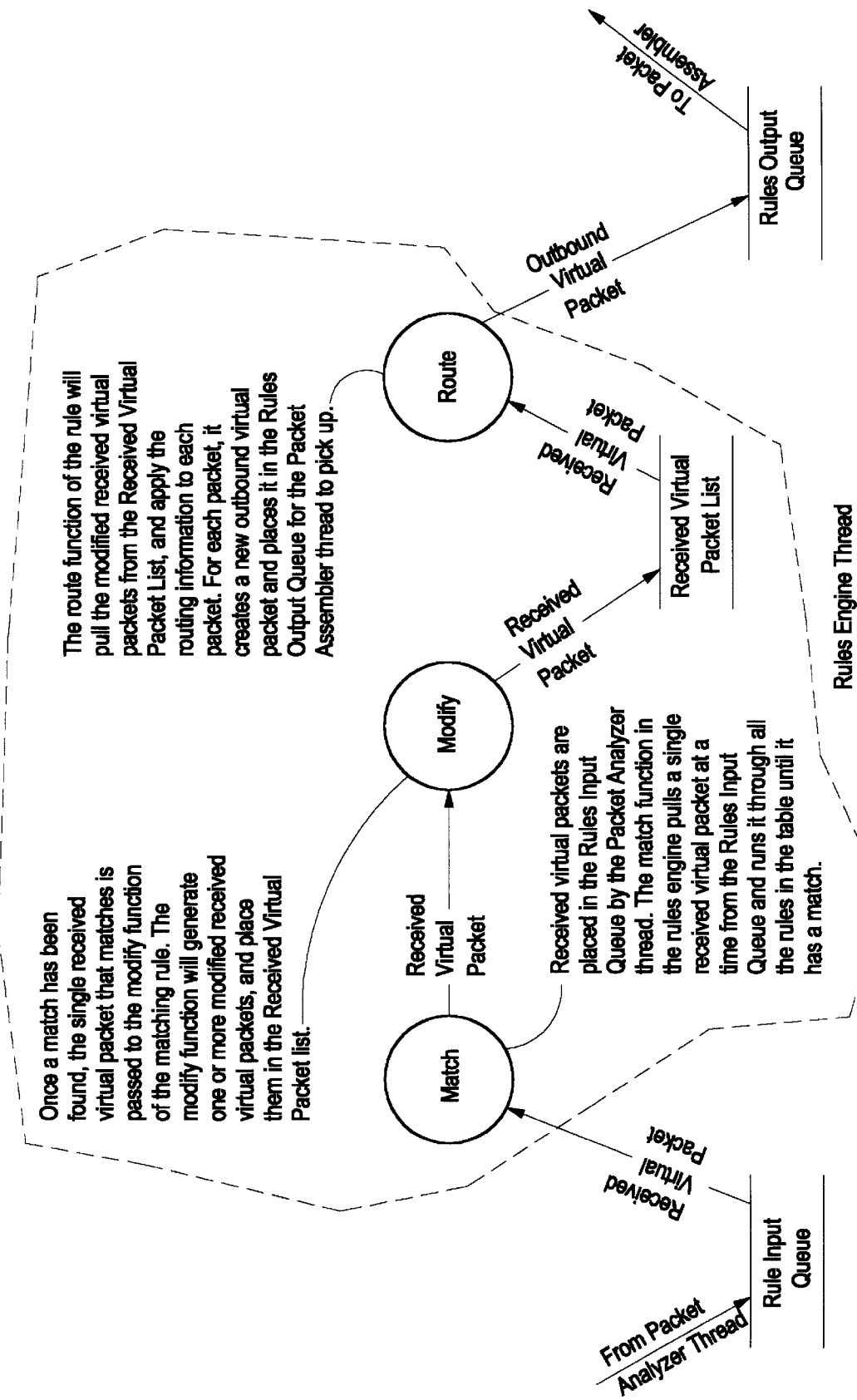
FIG. 5 is a depiction of the single thread, three part rules engine which is a fundamental component of the present invention.

A rule has three parts: a set of matching conditions (how a packet of interest is recognized), a set of possible modifications (how the packet may be transformed) and a routing action (how to tell the packet where to go.) As shown in FIG. 5, the rules engine in the presently preferred embodiment is a single thread that contains these three parts as functions inside of it. The rules engine thread pulls received virtual packets from the rules input queue (placed there by the Packet Analyzer thread) and posts outbound virtual packets to the rules output queue where they are picked up by the Packet Assembler thread.

The rules engine is a simple, yet flexible, scheme that takes advantage of C++ polymorphism—the ability to invoke a function on an object without actually knowing the type of object, and having it do the right thing. This approach has two particular advantages:

New types of rules may easily be added without changing the rules engine.

Complicated rules, using Boolean logic, that may not initially be supported in a interface, can easily be created and added.

Matching Packets

The user interface allows a user to match packets of interest by selecting multiple items from a dialog box. The dialog box is a way for the user to set up implied logical "AND" and "OR" conditions that an incoming packet has to meet to be identified as a "match". For example, the dialog shown in FIG. 6 expresses "match all packets that come in on port 10 AND have a source address of 1234 OR in the range 2000 to 3000 OR in the range 7000–7100 AND have a destination address of 3333 OR 1 OR 2 OR 3".

The match conditions portion of a rule can thus be defined as consisting of two different elements: 1) individual match conditions ("the port must be 10") and 2) collections of match conditions ("the source can be 1234 OR the source can be between 2000 and 3000 OR the source can be between 7000 and 7100 AND can have a destination address of 3333 OR 1 OR 2 OR 3").

The matching conditions collections are of two types: 1) an AND collection in which all individual tests in the collection have to test true for the whole condition to be true, and 2) an OR collection in which any individual test in the collection can test true for the whole condition to be true. In the previous example, the whole set of matching conditions for this particular rule is an AND collection; viz.: the port must be correct AND the source must be correct AND the destination must be correct. The source part is an OR collection: the source address can be 1234 OR in the range 2000–3000 OR in the range 7000–7100. The destination part of the rule is also an OR collection: the destination address can be 3333 OR 1 OR 2 OR 3. In fact, the whole rules table (consisting of all the rules) can be thought of as one comprehensive OR collection: by iterating through the collection, looking for a match, it is known that a match is obtained when any one of the rules has a collection of matching conditions that are satisfied.

Figure 7:
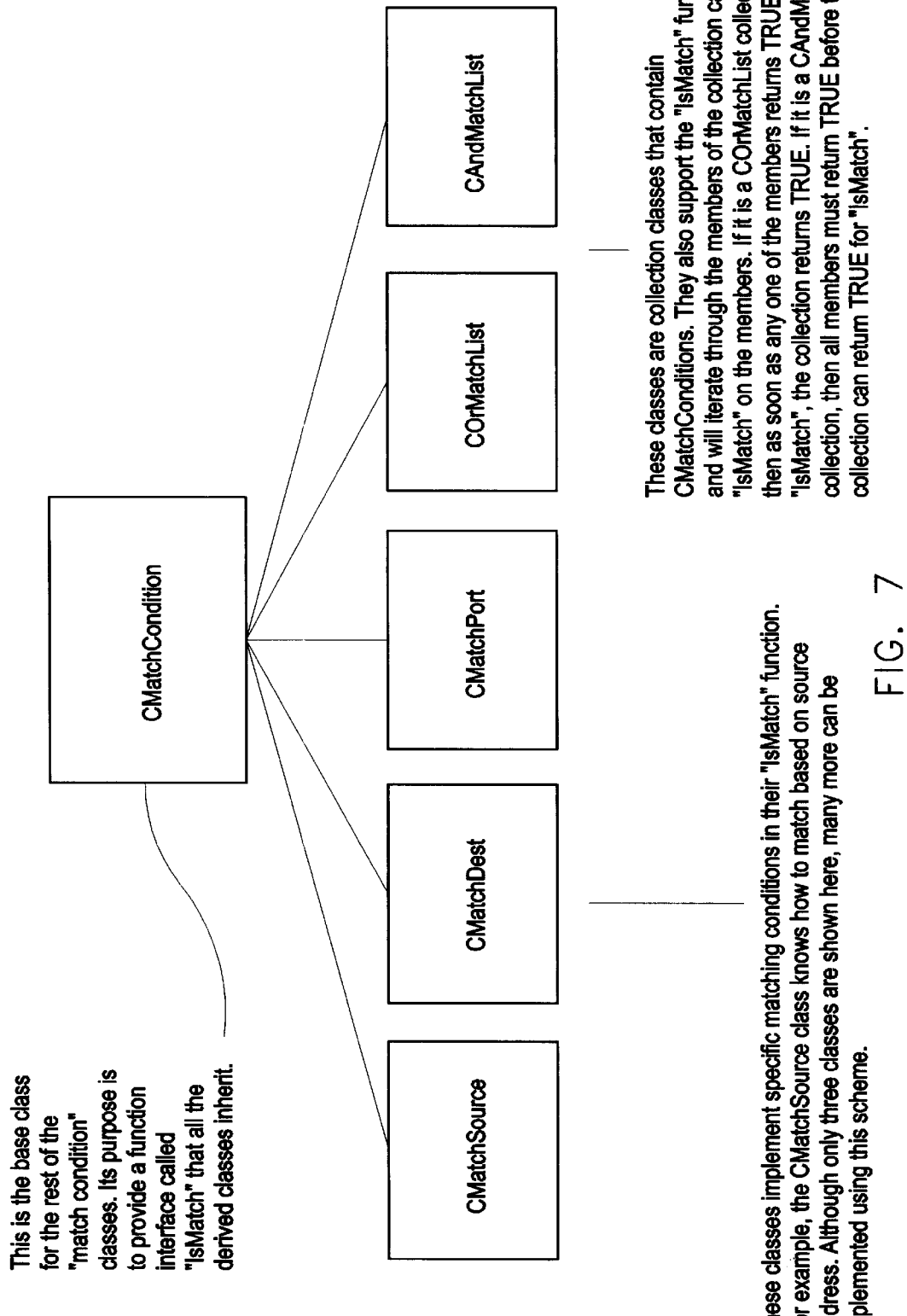
FIG. 7 illustrates the C++ class hierarchy as set up in the presently preferred embodiment for the Match Packet aspect of a rule.

This model can be represented with some simple C++ classes. A base class, CMatchCondition, provides a interface that is inherited by both individual match condition classes ("match a port") and also by match condition collections ("match any source address in this collection"). Each different match condition is implemented by a different class derived from CMatchCondition; for example, there are CMatchPort, CMatchSource, and CMatchDest classes. FIG. 7 illustrates the class hierarchy.

Each class derived from CMatchCondition overrides the virtual IsMatch function defined in the base class. The IsMatch function takes a pointer to a received virtual TNPP packet ("virtual" in the sense of an internal TNPP packet format, not "virtual" in the C++ sense) and returns a Boolean TRUE if the packet meets the condition that the class is designed to look for. For example, a CMatchSource object can be created to match an address range of 1000–2000. If the IsMatch function is called on an object with a received virtual packet argument having a source address of 1234, the IsMatch function will return TRUE. Conversely, if the IsMatch function is called on a received virtual packet with source address of 9999, the IsMatch function for the object will return FALSE.

By combining the individual match conditions objects into the match condition collections, complicated rules, such as the example shown above, can be established. To implement the matching condition for the example, conditions and condition collections would be created as follows:

One CAndMatchList object ("rule1MatchingConditions") containing three members:

1) a single CMatchPort object, set to match port 10;
2) a COrMatchList object containing three members:
   a) a CMatchSource object, set to match source address 1234;
   b) a CMatchSource object, set to match the source address range 2000–3000; and
   c) a CMatchSource object, set to match the source address range 7000–7100; and
3) A COrMatchList object containing four members:
   a) a CMatchDest object, set to match destination address 3333;
   b) a CMatchDest object, set to match destination address 1;
   c) a CMatchDest object, set to match destination address 2; and
   d) a CMatchDest object, set to match destination address 3.

The rules "engine" now becomes very simple. To determine if a particular virtual packet matches the conditions laid out for rule 1, it is only necessary to invoke IsMatch as follows:

```
if (rule1MatchingConditions.IsMatch(&virtualPacket) = TRUE)
    // You've got a match
else
    // You don't
```

Because rule1MatchingConditions is a CAndMatchList object, it will invoke IsMatch on all of its members in turn. It will call IsMatch on the CMatchPort object; if it returns FALSE, the IsMatch for the rule1MatchingConditions object will terminate immediately with a return value of FALSE (because it is an AND collection, and all members must return TRUE for IsMatch for the collection to return TRUE). If the CMatchPort object returns TRUE, then IsMatch is invoked on the next member of the rule1MatchingConditions object: the COrMatchList object containing the valid source addresses. Since it is an OR collection, it will invoke IsMatch on each of its members; if any of them return TRUE, then it stops invoking IsMatch and returns TRUE for the collection. This process continues, stepping through the various conditions and collections of conditions, until the return value can be determined.

Match Condition Classes

The match condition classes are very simple. They perform one task: given a single received virtual TNPP packet, determine if their particular condition is met. They do this by examining the packet, and comparing specific fields in the packet to values used when the object was created. For example, exemplary code for the CMatchSource class (matches the source TNPP address in a packet) looks like this:

```
// A constructor for matching a specific TNPP source address
CMatchSource::CMatchSource(DWORD dwSingleAddr)
    {
    m__dwEndingAddr = m__dwStartingAddr = dwSingleAddr;
    }
// A constructor for matching a TNPP source address range
CMatchSource::CMatchSource(DWORD dwBeginAddr,DWORD
dwEndAddr)
    {
    m__dwStartingAddr = dwBeginAddr;
    m__dwEndingAddr = dwEndAddr;
    }
// Function for matching source address
BOOL CMatchSource::IsMatch(CReceivedVPkt* pVPkt)
    {
    BOOL bMatch;
    if ((pVPkt->m__wSourceAddr >= m__wStartingAddr) &&
        (pVPkt->m__wSourceAddr <= m__wEndingAddr))
        bMatch = TRUE;
    else
        bMatch = FALSE;
    return bMatch;
    }
CMatchSource objects are created as follows:
    // Source can be 1234,2000-3000,7000-7100
    CMatchSource* pRule1SourceOne =
    new CMatchSource(0x1234);
    CMatchSource* pRule1SourceTwo = new
    CMatchSource(0x2000,0x3000);
    CMatchSource* pRule1SourceThree = new
    CMatchSource(0x7000,0x7100);
CMatchSource objects can be gathered into a collection as follows:
    // Make a list out of the source addresses
    COrMatchList* pRule1SourceList = new COrMatchList;
    pRule1SourceList->AddTail(pRule1SourceOne);
    pRule1SourceList->AddTail(pRule1SourceTwo);
    pRule1SourceList->AddTail(pRule1SourceThree);
CMatchDest objects are created as follows:
    // Dest can be 3333, 1, 2, 3
    CMatchDest* pRule1DestOne = new CMatchDest(0x3333);
    CMatchDest* pRule1DestTwo = new CMatchDest(0x1);
    CMatchDest* pRule1DestThree = new CMatchDest(0x2);
    CMatchDest* pRule1DestFour = new CMatchDest(0x3);
The CMatchDest objects can then be placed into a collection as follows:
    // Make a list out of the dest addresses
    COrMatchList* pRule1DestList = new COrMatchList;
    pRule1DestList->AddTail(pRule1DestOne);
    pRule1DestList->AddTail(pRule1DestTwo);
    pRule1DestList->AddTail(pRule1DestThree);
    pRule1DestList->AddTail(pRule1DestFour);
CMatchPort objects may be created as follows:
    // Port must be 1
    CMatchPort* pRule1Port = new CMatchPort(1);
All the matching conditions for a particular rule can be combined by
combining the individual match conditions and the match condition
collections all together as follows:
    // Now put all the matching conditions in one rule List
    CRule* pRule1 = new CRule;
    pRule1->AddCondition(pRule1SourceList);
    pRule1->AddCondition(pRule1DestList);
    pRule1->AddCondition(pRule1Port);
```

Modifying Packets

Once a packet has been properly matched, it is necessary to consider if and how it will be modified. It is not necessary to modify a packet; in fact, the simplest (and probably the most common) use of the NPG is to match a particular packet, and then route it, unmodified, to a specific port. Packet modifications, however, permit special things to be done to a packet: e.g., the type of packet may be altered; i.e., turn one packet into many, etc.

Modification Classes

Figure 8:
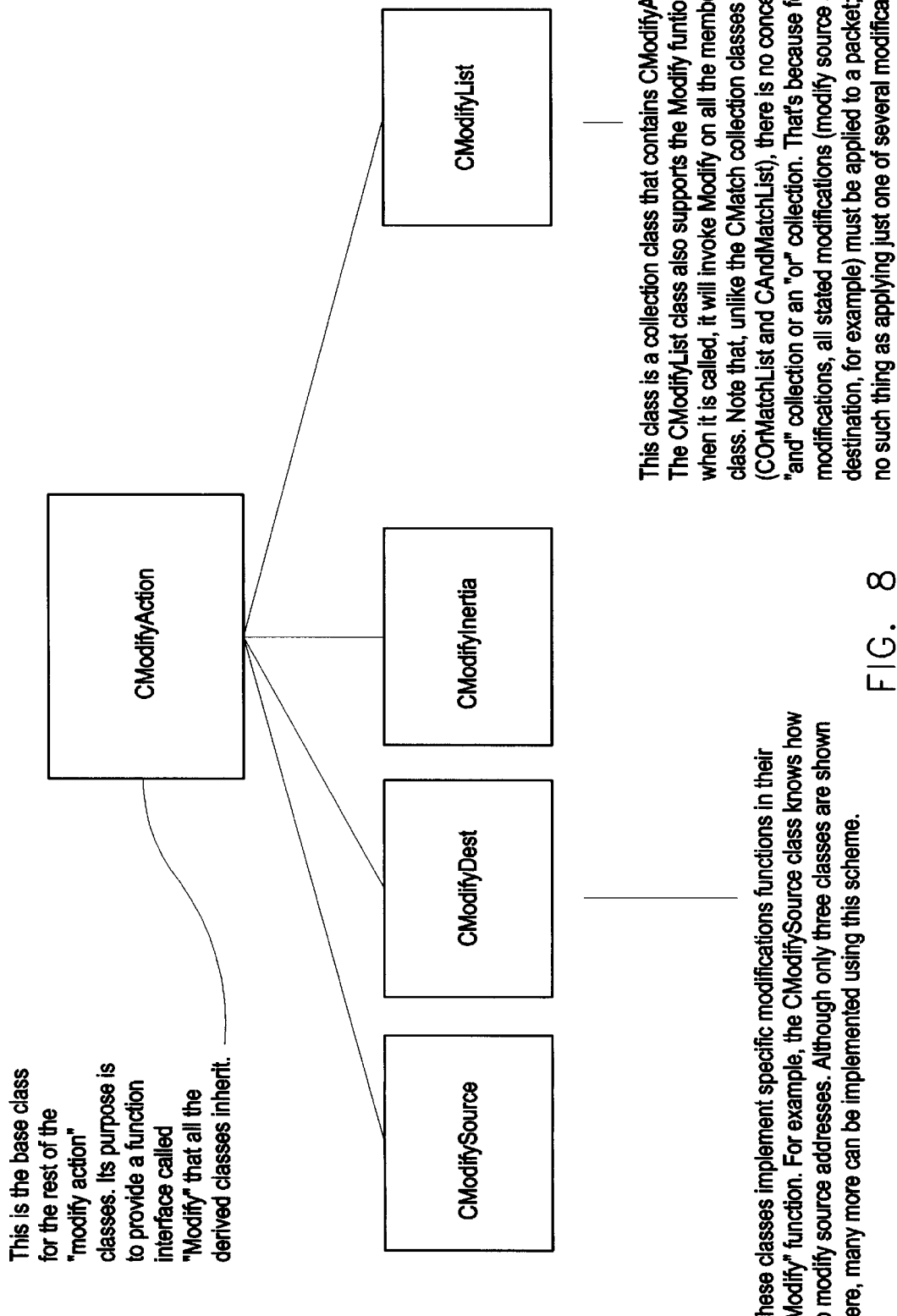
FIG. 8 is illustrates the C++ class hierarchy as set up in the presently preferred embodiment for the modification(s) aspect of a rule.

The modifications process is similar to the matching conditions process; a set of C++ classes is developed to handle the various modifications that the user may want to do. For example, in the presently preferred embodiment, there is a CModifySource class for modifying source addresses, a CModifyDest class for modifying destination addresses, etc. FIG. 8 shows the class hierarchy.

It may be noted that there is only one kind of collection class for modifications: CModifyList. Unlike match conditions, which have two boolean logic collection kinds (COrMatchList and CAndMatchList), modifications can only be collected in one way: do all the modifications in the collection. In this context, it makes no sense to direct "do some of the modifications".

```
CModifySource objects are created as follows:
    // Modify source to be 8000 and 8100
    CModifySource* pRule1ModifySourceAction1 = new
        CModifySource(0x8000);
    CModifySource* pRule1ModifySourceAction2 = new
        CModifySource(0x8100);
```

A CModifyList object to hold the CModifySource objects can be created as follows:

```
// Make a collection to hold the source modify list
    CModifyList* pRule1SourceModifyList = new CModifyList;
The source modifications may be placed in the list as follows:
    pRule1SourceModifyList->AddTail(pRule1ModifySourceAction1);
    pRule1SourceModifyList->AddTail(pRule1ModifySourceAction2);
Destination modifications can be created as follows:
    // Modify destination to be 1-3
    CModifyDest* pRule1ModifyDestAction1 = new
    CModifyDest(0x1,0x3);
```

A CModifyList object to hold the CModifyDest objects may be created as follows:

```
// Put the destination modification actions in a list
    CModifyList* pRule1DestModifyList = new CModifyList;
Destination modifications can be placed in the list as follows:
    pRule1DestModifyList->AddTail(pRule1ModifyDestAction1);
An inertia modification can be made up as follows:
    // Now make up a inertia modification
    CModifyInertia* pRule1ModifyInertiaAction = new
    CModifyInertia(5);
```

All the modifications for a particular rule can be combined by combining the individual modifications and the modification collections all together:

```
// Now put all the modifications in the rule
pRule1->AddModification(pRule1SourceModifyList);
pRule1->AddModification(pRule1DestModifyList);
pRule1->AddModification(pRule1ModifyInertiaAction);
```

Multiple Modifications

Figure 9A:
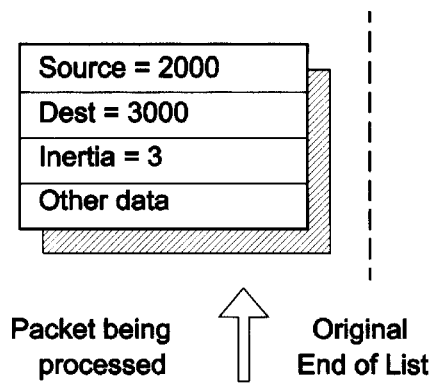
FIGS. 9A–9N, inclusive, illustrate the results of successive operations associated with effecting multiple modifications to a received packet before it is forwarded.

Referring to FIG. 9A, it may be necessary to perform more than one modification to a packet. For example, a packet with source address 1000 and destination address 2000 may be matched, and it is necessary to modify the packet by changing the source address to 8000 and the destination address to 9000. This example shows a simple case: taking a packet and changing two fields in it. Here, the source and destination address fields are modified one-for-one, i.e., one source address is replaced by a single source address, and one destination address is replaced by a single destination address.

Figure 9B:
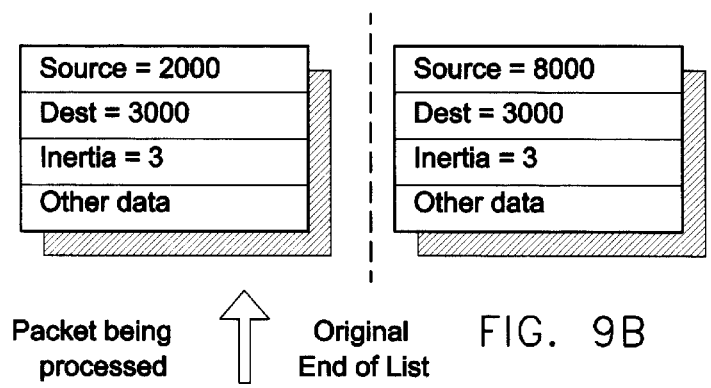

A different situation arises when the modification portion of the rule is written such that a single packet is turned into multiple outbound packet as shown in FIG. 9B. This example shows a complex case: taking a packet and changing two fields in it, using more than one value for each of the fields. Here, the source and destination address fields are modified with a range of addresses: the source is changed to 8000 and 8100; the destination is changed to the range 1–3. This implies that more than one packet is generated by the modifications; the number of packets is equal to the product of all the Is individual modifications (2 source modifications×3 destination modifications=6 new packets).

How Modifications are Applied

Figure 9C:
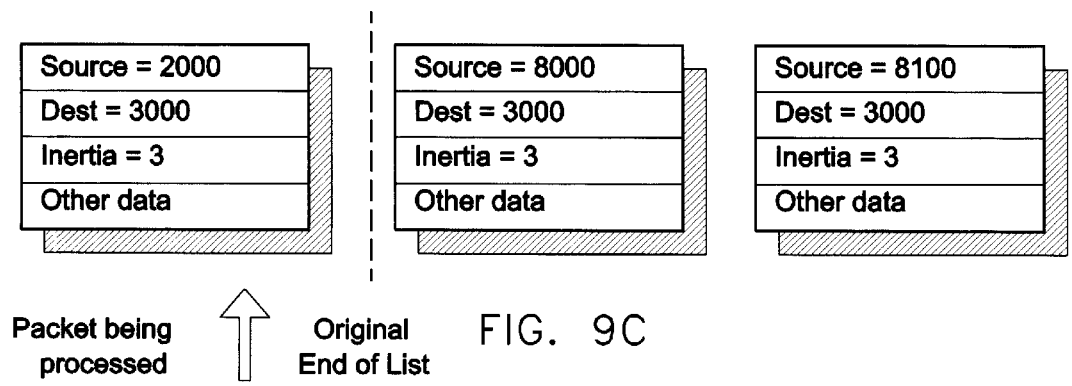
Figure 9D:
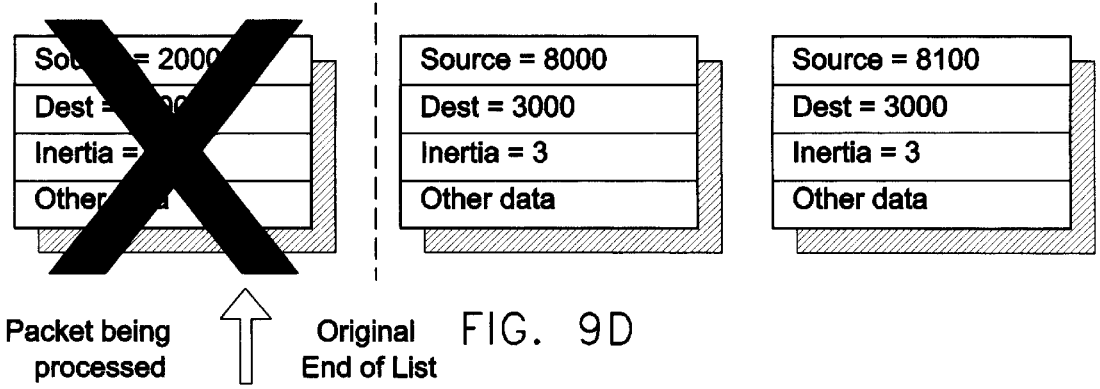
Figure 9E:
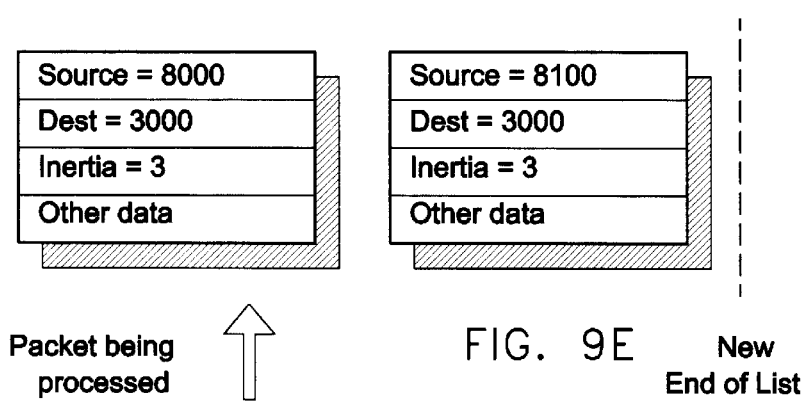
Figure 9F:
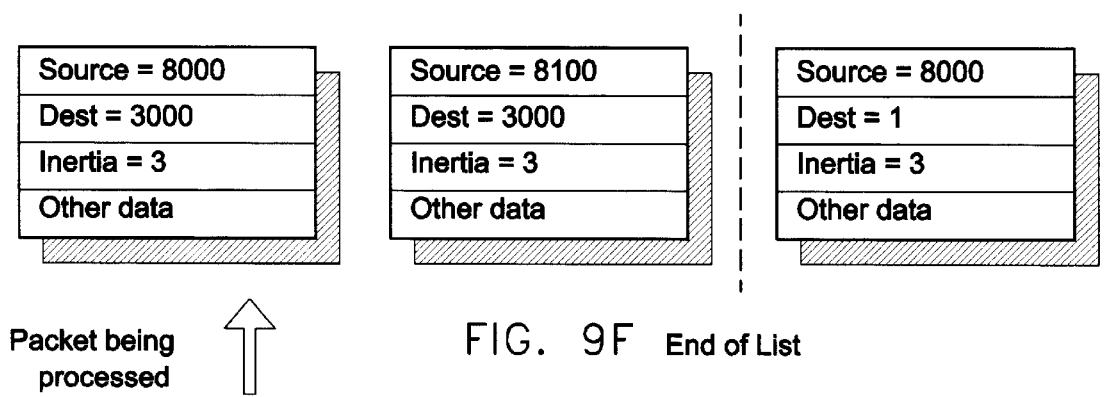
Figure 9J:
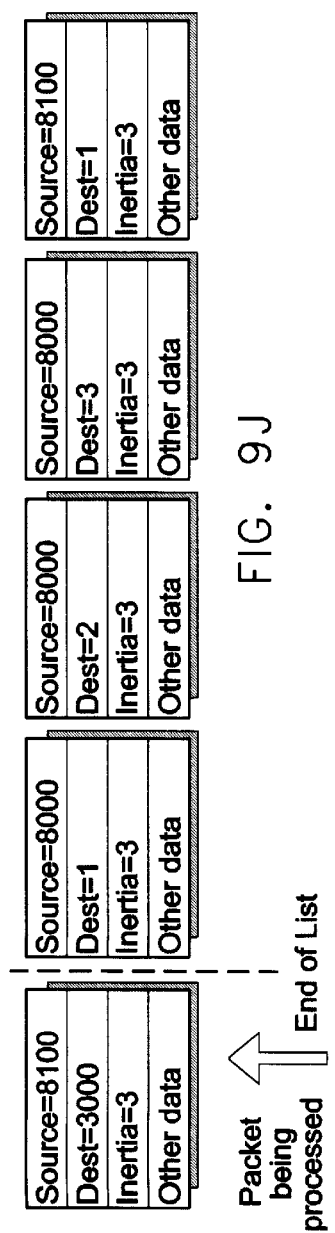
Figure 9K:
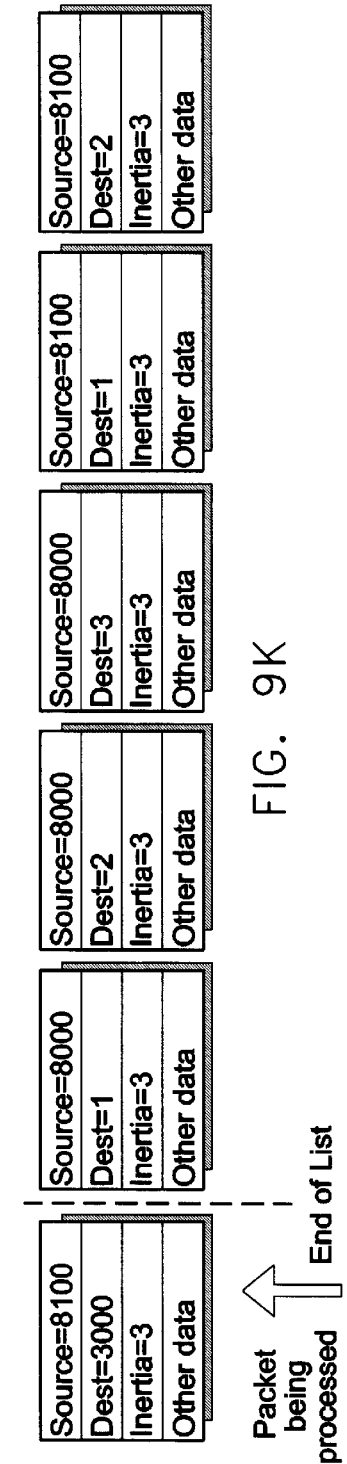
Figure 9L:
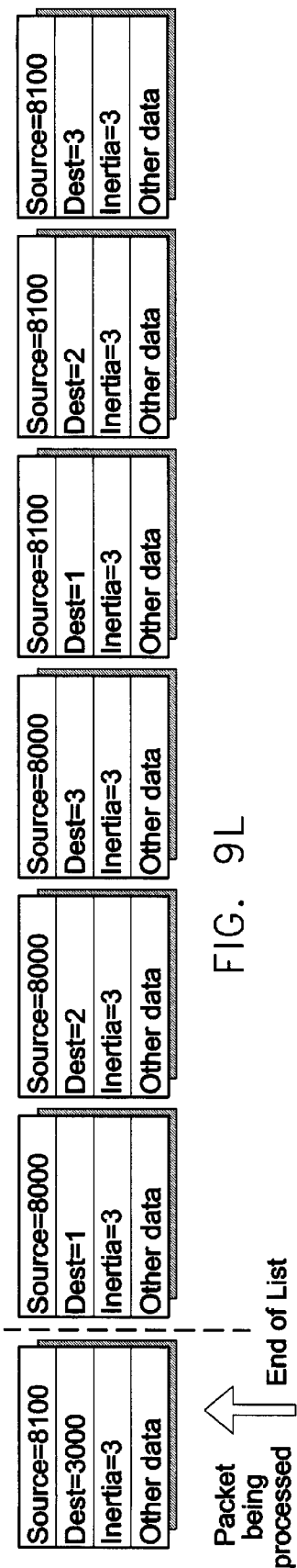
Figure 9M:
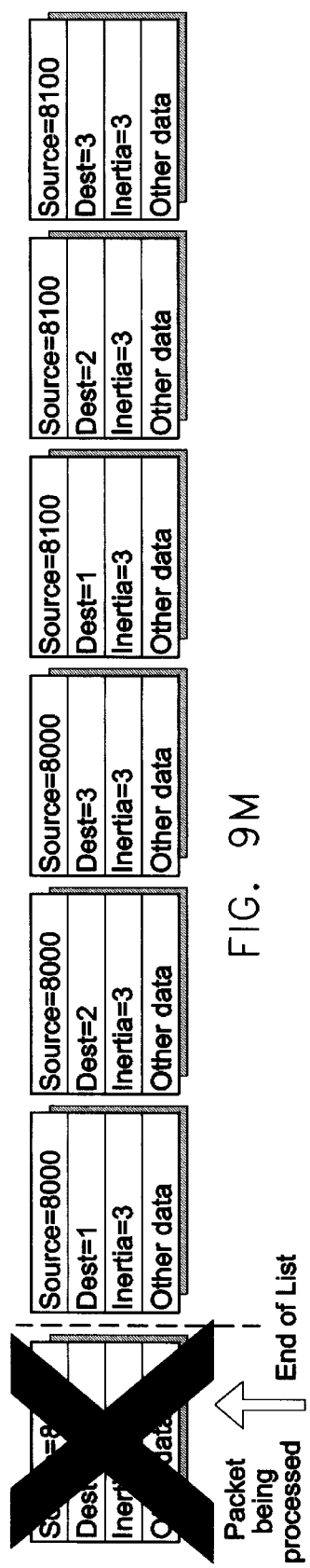
Figure 9N:
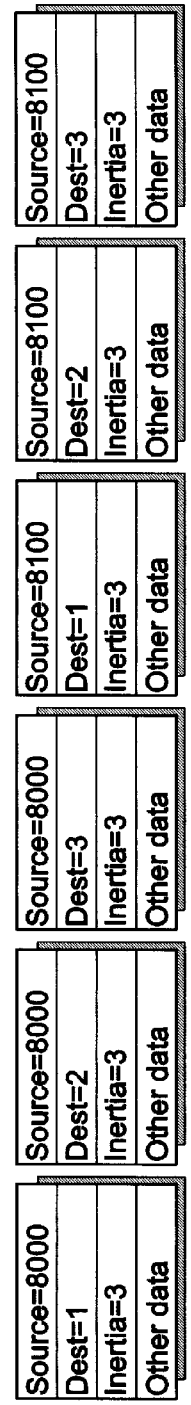

The code that handles packet modifications does so by taking the original matched packet and then iteratively applying the modification rules to the packet, placing any new packets that are generated in a CPacketList collection. Each time a specific set of modifications are carried out (for example, a collection of source modifications), the entire list of packets is walked, with the modifications generating new packets that are appended to the end of the list. FIGS. 9A–9N show the successive steps involved with the modification example shown previously (modify source to be 8000 and 8100, modify destination to be 1–3).

1. The first thing that happens when applying modifications is that a copy of the original source packet is placed in the CPacketList collection to prime the list for the modify process: FIG. 9A.

2. Next, the source modifications are applied. The source modifications call for making one packet with a source address of 8000 and one packet with a source address of 8100. First, a new packet with the source address of 8000 is appended to the end of the list: FIG. 9B, 3. The next source modification is then applied. This creates a new packet with a source address of 8100, which is appended to the end of the list: FIG. 9C.

4. Now all the source modifications have been made. The original packet that was used to prime the list is now deleted. The end of the list will now move to the end of the new packets that were appended to the list: FIG. 9D.

Figure 6:
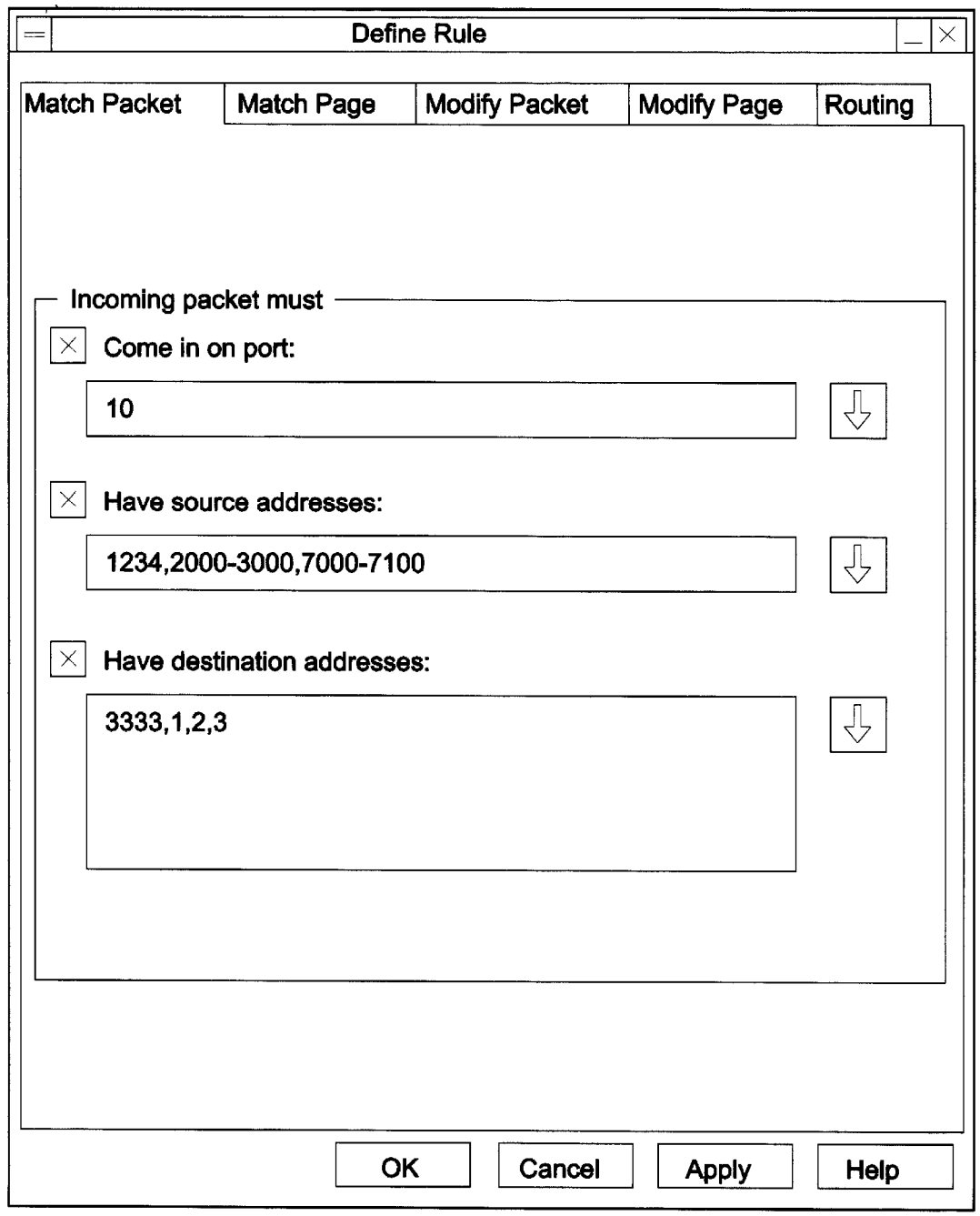
FIG. 6 shows an exemplary Define Rule window set up to illustrate the entry of information for setting up a Match Packet component of an exemplary rule.

5. Now the destination modifications can be carried out. At this point, there are two packets in the CPacketList collection that need to be modified. These two packets are the ones that were generated by applying the source address modifications: FIG. 9E 6. The first destination modification analyzes the first packet in the list and creates a new packet, with a destination address of 1, and appends it to the end of the list: FIG. 9F.

7. The second destination modification creates a new packet with a destination address of 2 and appends it to the end of the list: FIG. 9G.

8. The third destination modification creates a new packet with a destination address of 3 and appends it to the end of the list: FIG. 9H. At this point, all the destination modifications have been applied to the first packet in the list.

9. Since all the destination modifications have been applied to the first packet in the list, it can now be removed from the list: FIG. 9I.

10. Now the destination modifications are applied to the next packet in the list. First, a new packet with a destination address of 1 is created and added to the end of the list: FIG. 9J. (Note that this packet has a source address of 8100 this time.)

11. The next destination modification is applied, this time generating a packet with a destination address of 2: FIG. 9K.

12. The final destination modification is applied to generate a packet with a destination address of 3 that is appended to the end of the list: FIG. 9L.

13. Since all the destination modifications have been applied to this packet in the list, it can now be deleted from the list: FIG. 9M. This was the last of the original packets (generated by the source modifications) that needed to be processed.

14. All source and destination modifications have now been made. The CPacketList list now contains all the packets to be sent out. Starting with a single input packet with a source of 2000 and a destination of 3000, two modifications (set the source to 8000 and 8100, set the destination to 1–3) have been applied and six output packets have been generated: FIG. 9N.

Routing

Figure 10:
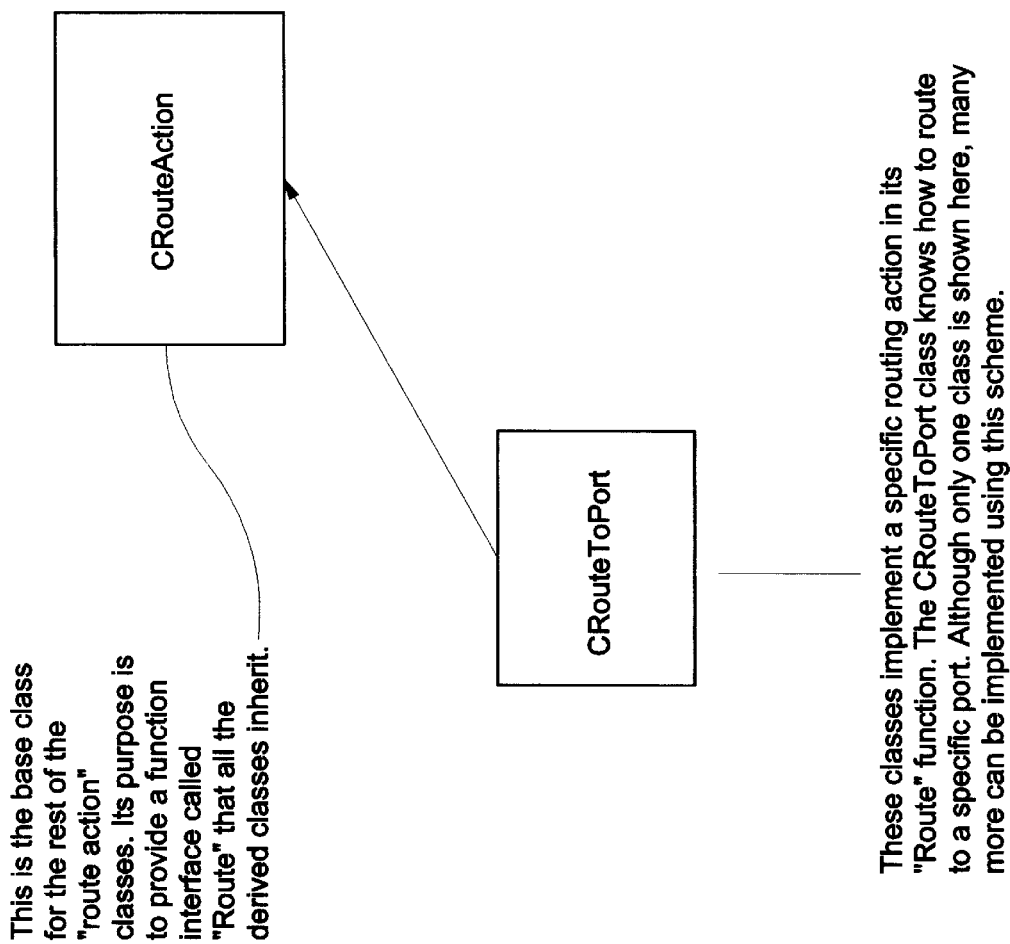
FIG. 10 illustrates the C++ class hierarchy as set up in the presently preferred embodiment for the routing aspect of a rule.

The routing process is similar to the matching conditions and modifications processes; a set of C++ classes is established to handle the various routing that the user may want to do. For example, there is a CRouteToPort class for routing a packet to a specific port. FIG. 10 shows the class hierarchy.

How Routing Actions are Applied

The code that handles packet routing does so by pulling the modified received virtual packets from the received virtual packet list (class CReceivedVPktList) created by the modification process. A single packet is pulled, and a new outbound virtual packet is created to hold it and the routing information. The routing information is applied by calling the "Route" function of the rule to the new outbound virtual packet which is then placed in the Rules Output Queue, where it will be picked up by the Packet Assembler thread.

Routing objects can be created as follows:

```
// Now make up a routing action
CRouteToPort* pRule1RoutingAction = new CRouteToPort(1);
// Put it in the rule
pRule1->AddRouting(pRule1RoutingAction);
```

DATABASE

The NPG database stores all the relevant information about the TNPP traffic that has passed through the NPG. Every page in a TNPP packet (a TNPP packet can contain more than one page) is broken apart into a separate row in the database; there is a first row for the page when it comes in and one a second row when it goes out. The fields in the database are shown in FIG. 11.

ASSUMPTIONS

Since various portions of the NPG functionality are based on certain assumptions, it is important to verify that the assumptions are correct. Although a single TNPP packet may contain multiple data blocks (and hence, multiple pages), each page can be considered as having arrived in separate packets for the sake of examining and routing the pages. The NPG will burst the packets apart into separate virtual packets and deal with those. On the output side, the NPG may decide to combine separate virtual packets into one physical packet (based either on how the packets were combined when they came in or based on how many are going to a particular destination). Combining packets is not required, but it improves efficiency by not requiring separate acknowledgments for each page contained within a packet. All connections between nodes are considered bidirectional, (i.e. they both send and receive TNPP packets).

Inbound dialup lines are not associated with any particular carrier unless pre-arranged by the user; i.e., any other node can call in at any time unless the user has made prior arrangements to restrict the access to a particular dialup port (by only giving the phone number to certain parties, for example). The implication of this is that packets received on a dialup port cannot be positively identified as coming from source X, other than by the node address. If two paging carriers use TNPP node id X, it cannot for certain be ascertained which one the packet came from on a dialup connection. No validation of the packets coring in on an inbound line will be performed other than supplied by the user in the form of rules.

It is not necessary to know about the other nodes in the network other than those directly connected to the NPG because the TNPP protocol is node-to-adjacent-node, not end-to-end.

A single node may have multiple TNPP addresses.

The NPG can act as either an active node or a passive node on a per-packet basis, depending upon how the packet modifications are specified in the routing rules. (As an active node, it replaces the source address with its node address before passing a packet on. As a passive node, it simply passes on the source node address it was handed.) In either case, the NPG is responsible for maintaining its own packet serial numbers to outbound nodes.

The NPG will accept all packets sent to it; i.e., it should never return a packet back to the originator. It may decide (based on the rules) to not route the packet back out anywhere, however, essentially discarding it. (In all cases a transaction is logged.)

Any non-paging packets (ETE, COMMAND, STATUS, DATA, etc.) will be routed by the NPG according to the established rules. The NPG is not set up to respond to any of these packets (i.e., it doesn't participate in any ETE conversations, and it does not respond to any COMMAND, STATUS, or DATA packets sent to it. This implies that the NPG cannot be reconfigured on the fly merely by sending it any "magic" TNPP packets.) The NPG will not examine the actual data in the page, other than to handle the rule that specifies "truncate this message if it is longer than x bytes".

INFORMATION MODELING

A list of features is useful in teaching the invention because those skilled in the art can readily understand, conceptually, what each feature is intended to do (if not in actual detail). Thus, within each brief "this feature should do this" statement is substantial implied information which may be used to actually implement the feature. An information model provides a way of capturing this information in a short-hand notation that can then be used directly in the replication process. used to actually implement the feature. An information model provides a way of capturing this information in a short-hand notation that can then be used directly in the replication process.

If a list of features is compared to an information model, each feature should be represented (perhaps in several segments, in several places) in the model. The immediately following passages explain how information modeling works. Then, the extended discussions that follow present specific features of the NPG, using the information model notation to capture what the features do and how.

Information Model Notation

The information model uses this notation:

$x = a + b + (c)$
   is read as "x consists of a and b and an optional (could be empty) c".
   Example:
      bigDate = dinner + movie + (flowers)
$x = a + \{b + c\}$
   is read as "x consists of a and some number (can be from 0 to many) of b's and c's".
   Example:
      dogShow = showLocation + {dog + owner}
$x = [a|b|c]$
   is read as "x consists of a or b or c".
   Example:
      newCarColor = [red|blue|green]
$x,y = z$
   is read as "x and y contain the same type of information (z)".
   Example:
      homeAddress, workAddress = address Working Through the Information Model To work through the information model, start at one entry and keep drilling down through the fields in the entry until they bottom out at the entries in the physical data dictionary as shown, for example, in FIG. 12. The physical data dictionary of FIG. 13 gives the actual descriptions of the data types represented in the information model.

General Configuration Information Model

FIG. 14 reveals the fall configuration for the NPG. Various elements of the configuration are detailed in the following sections.

Network Topology Information Model

The information set forth in FIG. 15 is used to describe the TNPP network topology. It is not needed for implementing the NPG (it only really needs to know about the nodes directly connected to it, and to have routing rules to route packets to the other nodes), but, for the sake of completeness, this information is modeled here.

Port Configuration Information Model

FIG. 16 (FIGS. 16A and 16B taken together) reveal the actual ports on the NPG that are used to connect to the other nodes in the TNPP network.

Received Packet Content Information Model

The basic unit of data that the NPG deals with is a packet. FIG. 17 describes all the information available when a packet is received.

TNPP Packet Information Model

FIG. 18 illustrates what a TNPP packet includes and was developed from the TNPP protocol.

Virtual Packet Information Model

Referring to FIG. 19, each TNPP packet received from the TNPP 18 network can contain one or more data blocks. The NPG will split those data blocks apart and treat them as "virtual packets" as though they had come in as separate packets (containing only one data block each). Thus, if one TNPP packet containing four CAP pages is received, they are treated as four separate virtual packets. Thus, all the routing rules, transaction logging, etc., are applied and performed based on virtual packets. Each virtLal packet contains information that links it back to the original received TNPP packet.

Rules Table Information Model

Referring to FIG. 20, the rules in the NPG are what makes the system a router (or gateway). Each rule consists of three components: the matching conditions, the modifications and the routing. The matching conditions specify how a packet to be acted on is recognized, the modifications specify what to do to the packet and the routing information specifies how to route the packet out of the NPG.

Rules—Matching Conditions Information Model

As shown in FIG. 21, the matching conditions specify how which packets to apply a particular rule to is determined. It may be noted that the matching conditions are applied against each packet without regard to any packets previously received. This implies that only a current packet is being examined at a given time without comparing it to any packets previously received. This means that the presently preferred embodiment of the NPG will not support a rule that says "if a packet is received which is identical to one received before, do this . . . ". Of course, such functionality could be added if desired.

Rules—Modifications Information Model

Referring to FIG. 22, the modifications portion of the rules table allows specification as to how to modify the packets that matched the specified matching conditions. It is not necessary to modify a packet; it may be appropriate to merely route the packet out through a specific port (a task which is handled by the routing portion of the rule as described below). As will be apparent, modifications provide the capability to modify a packet. Thus, as examples, a packet destined for a particular node on the network can be redirected to another node, or the length of a page can be truncated, or the channel and zone data can be modified, etc.

Rules—Routing Information Model

As shown in FIG. 23, the routing portion of a rule is used to specify how a packet (or packets if the modifications caused multiple packets to be generated) is sent out of the NPG.

Database

The number and variety of statistics and reports that users could desire from the NPG precludes incorporating merely a set of "buckets" to hold statistical counters. For example, a given user may want to know how many POCSAG 1200 baud packets were received from a particular source, how many Golay pages were rejected, how many TNPP packets were sent to a particular destination—any number of "interesting" statistics.

Thus, the NPG captures and retains all relevant information about the packets received and transmitted and stores it in the database. Therefore, in addition to a standard set of statistics, a user has the power to obtain and manipulate any combination of database entries by accessing the database using SQL.

Database Transaction Configuration Information Model

Referring to FIG. 24, database transaction configuration is used to specify what information is actually stored in the database. This allows a user to tailor how much data is stored for each transaction. It may be noted that changing the configuration may require that the database be "scrubbed" since a new storage scheme is being implemented.

Database Transactions Information Model

FIG. 25 shows the actual information to be stored in the database. Refer to the data dictionary in the appendices to see the actual data types and sizes.

Data Dictionary

The data dictionary, FIGS. 26A, 26B and 26C taken together, shows the actual information types and limits for the information model. This information is used to guide the database developer and the user interface designer during the development process by providing actual data types and constraints on the data involved as established for the presently preferred embodiment.

SECURITY

The security system in the example is configured to provide two features: controlling access to the NPG, and providing an audit trail of activity. The basic access control security may be conventionally provided by Windows NT. This means that users will be assigned a username, password and permissions. The permissions will be defined by NPG-specific user groups: FIG. 27.

In addition to limiting access to the NPG, the Windows NT security system provides an audit trail of the activity of users. This audit trail is visible in the Security log of the Event Viewer application. The information logged includes: successful/unsuccessful logons, remote connections, start/stop of the NPG, configuration changes, etc.

Remote access security is handled by the Windows NT Remote Access Service (RAS). RAS requires that remote users be given the permission to dial in and that they have valid accounts on the system.

It may be noted that there are only two ways to get into and control the system: either locally (at the NPG system console) or remotely through RAS. It is not possible to reconfigure/control the NPG by sending it special TNPP packets.

USER INTERFACE

The user interface information is directly derived from all the other information models presented above. For example, because there is a routing rule information item that says a rule can be "Match a specific source address", it follows that the user interface must allow the user to select a specific source address to match.

User Roles and User Tasks

One way to begin to define a user interface is to list all the roles that a user may play while interacting with the system. For example, when a user installs a system he is playing the role of an installer; when he is managing a system (changing rules, for instance), he is playing the role of an administrator. Listing all the roles a user can play helps to get an idea of the user's mindset when they perform certain tasks.

Referring to FIG. 28, user tasks are specific tasks that a user performs to accomplish something. For example, "printing reports" is a task that a user might assume. "Monitoring performance" might be another such task. Generally, a user task is something that the user undertakes to completely perform in one session. Thus, "change the description on a rule" is not really a task—it's part of a larger, more encompassing task such as "Enter rules".

Figure 29:
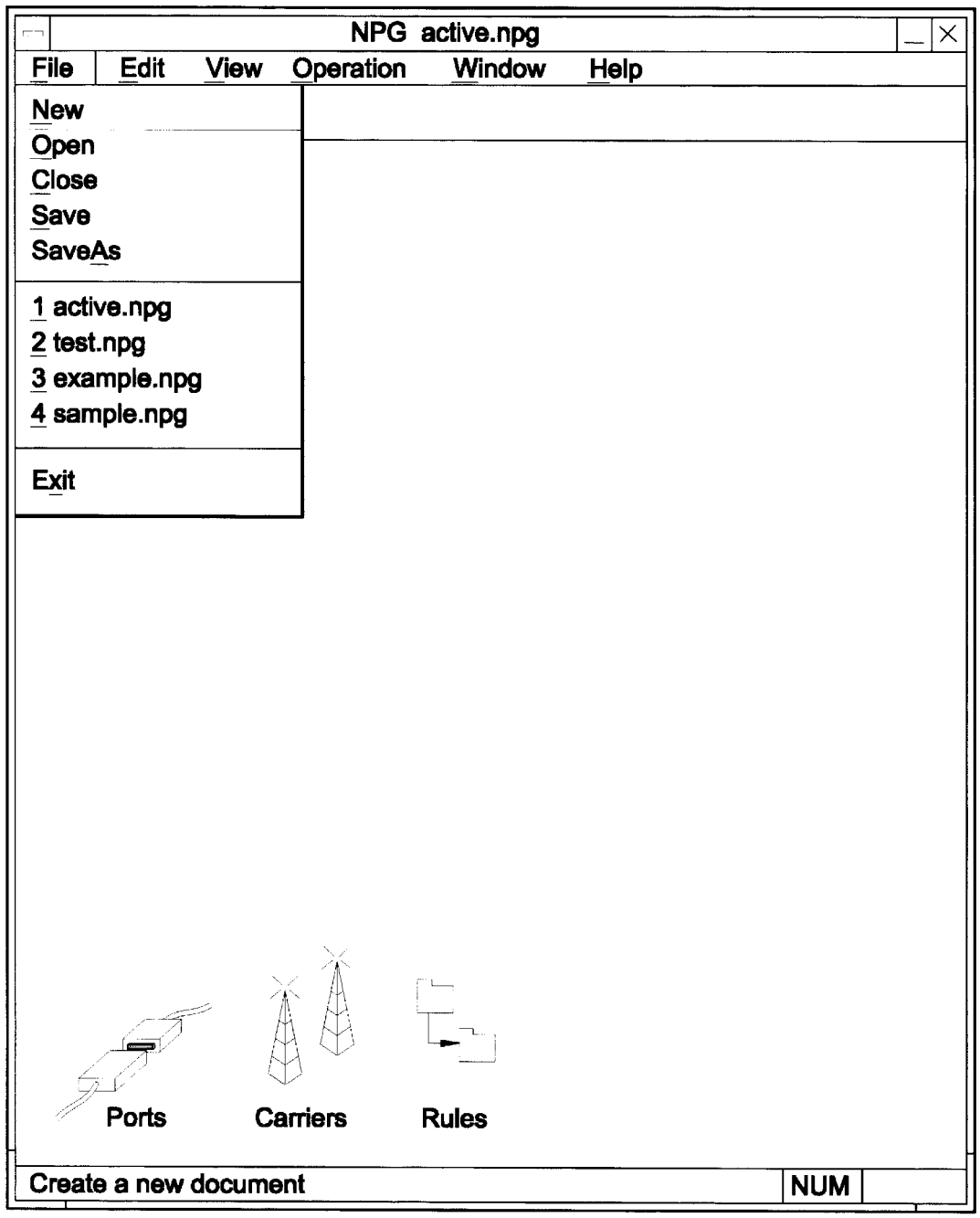
FIG. 29 is a view of the main NPG window illustrating a first drop-down menu (the File Menu)
Figure 31:
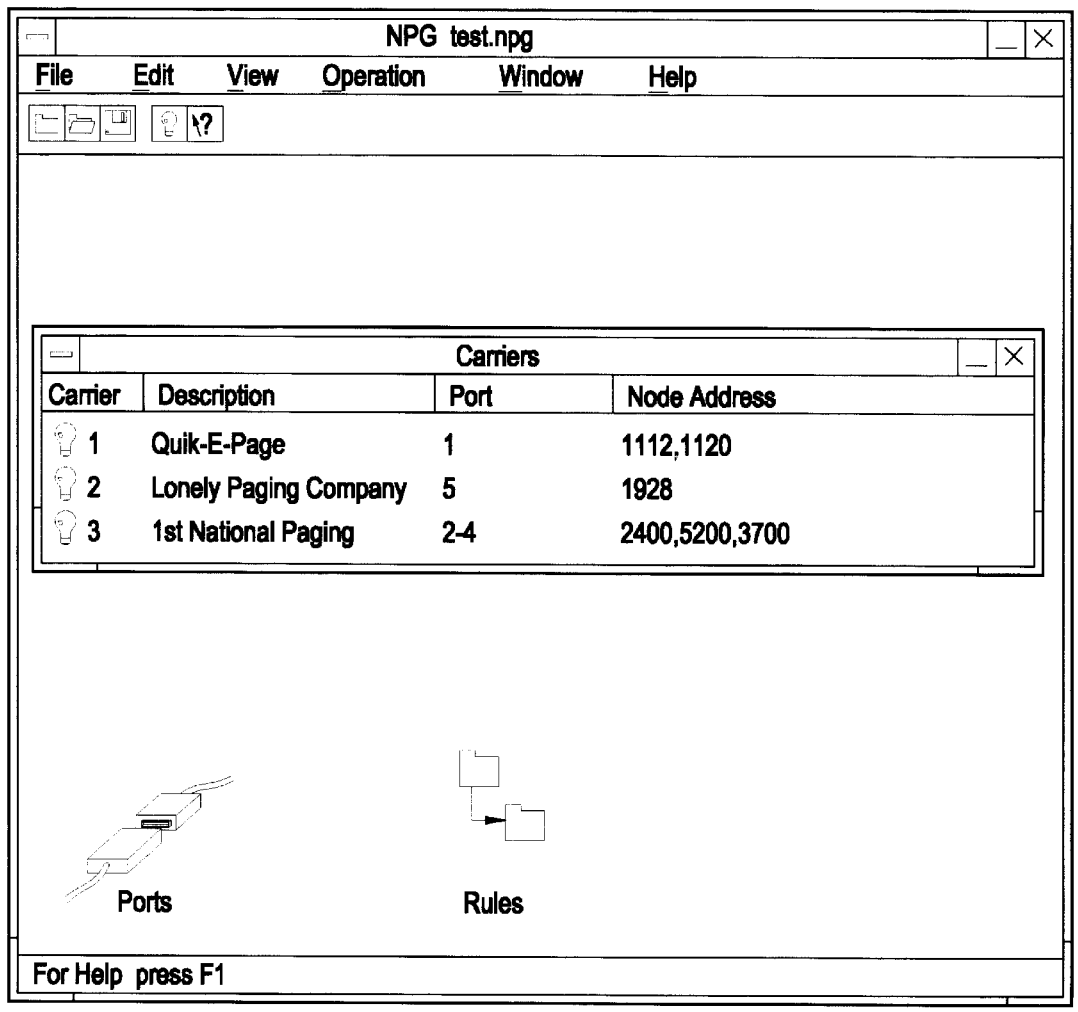
FIG. 31 shows an exemplary addresses configuration window.
Figure 32:
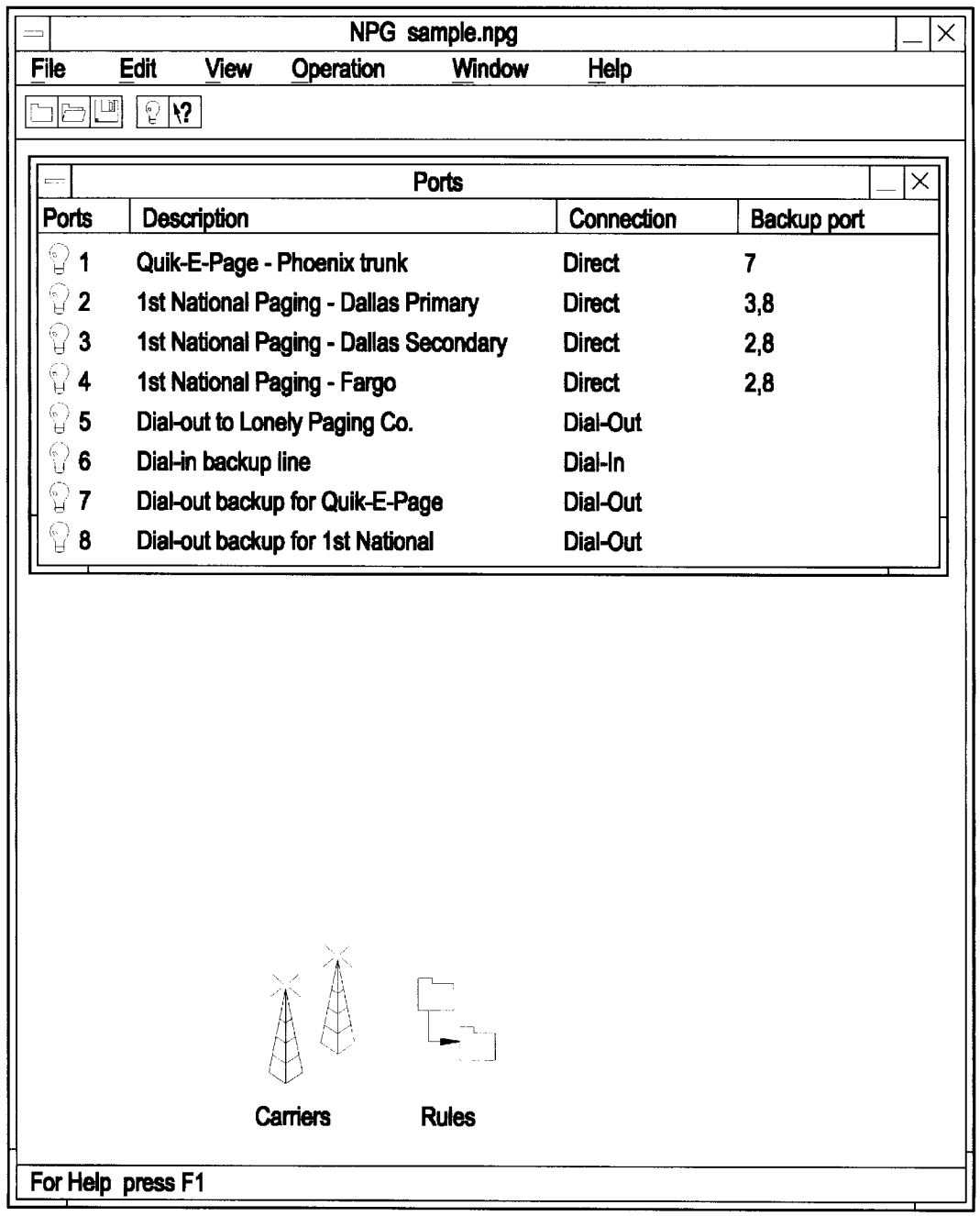
FIG. 32 shows an exemplary port configuration window.
Figure 33:
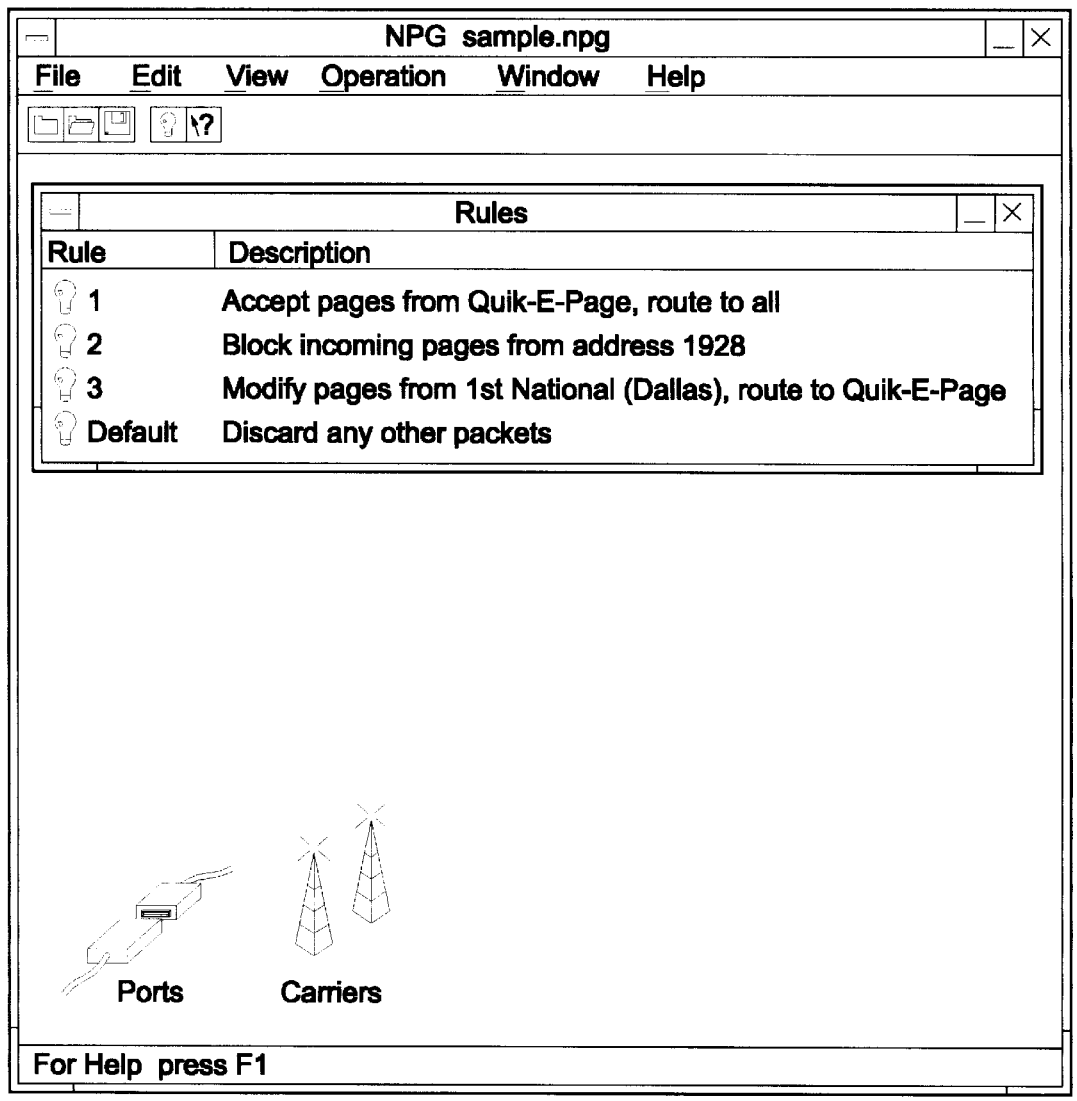
FIG. 33 shows an exemplary three-part rules display window.
Figure 34:
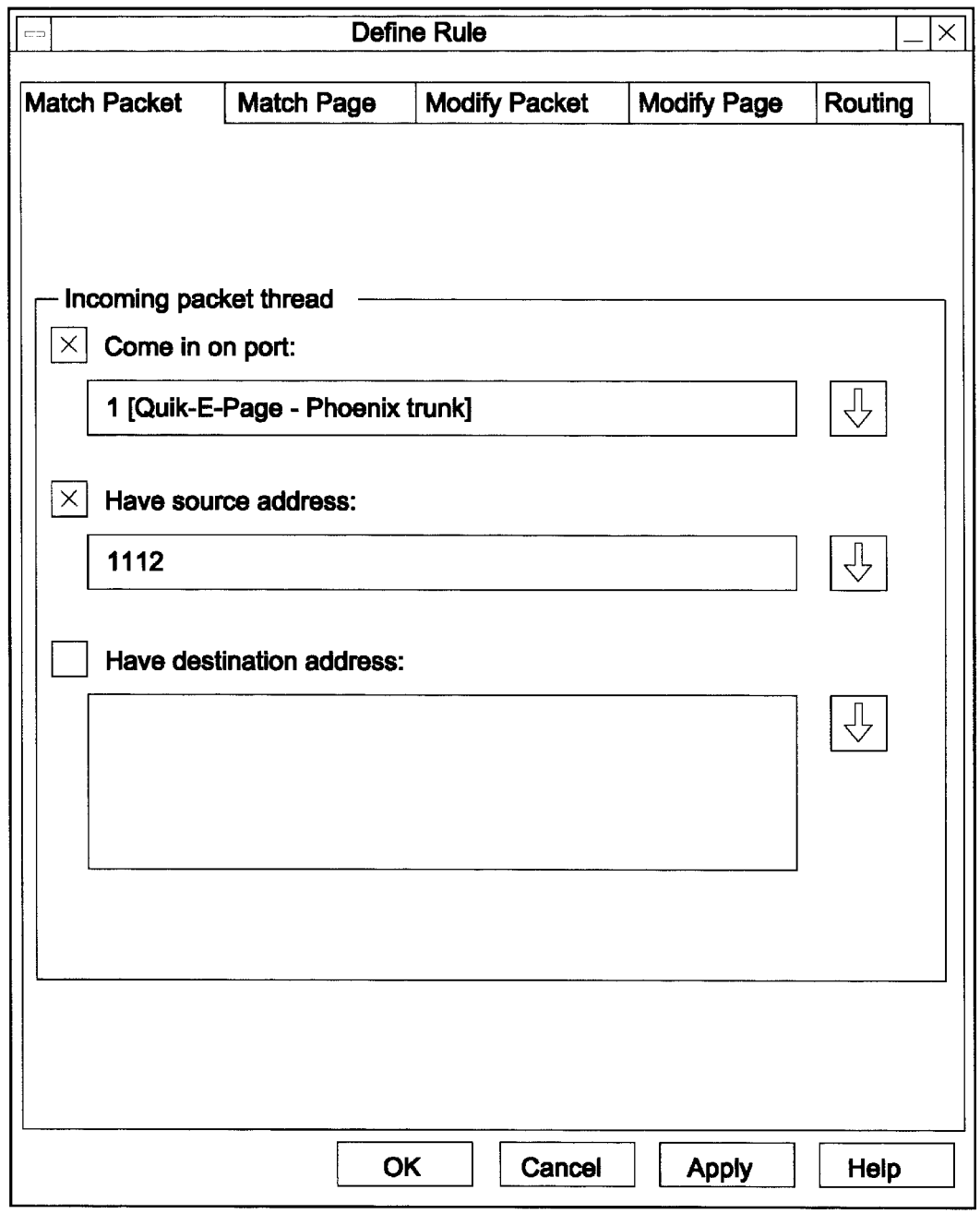
FIG. 34 shows an exemplary window for use in defining matching conditions for a TNPP packet.
Figure 35:
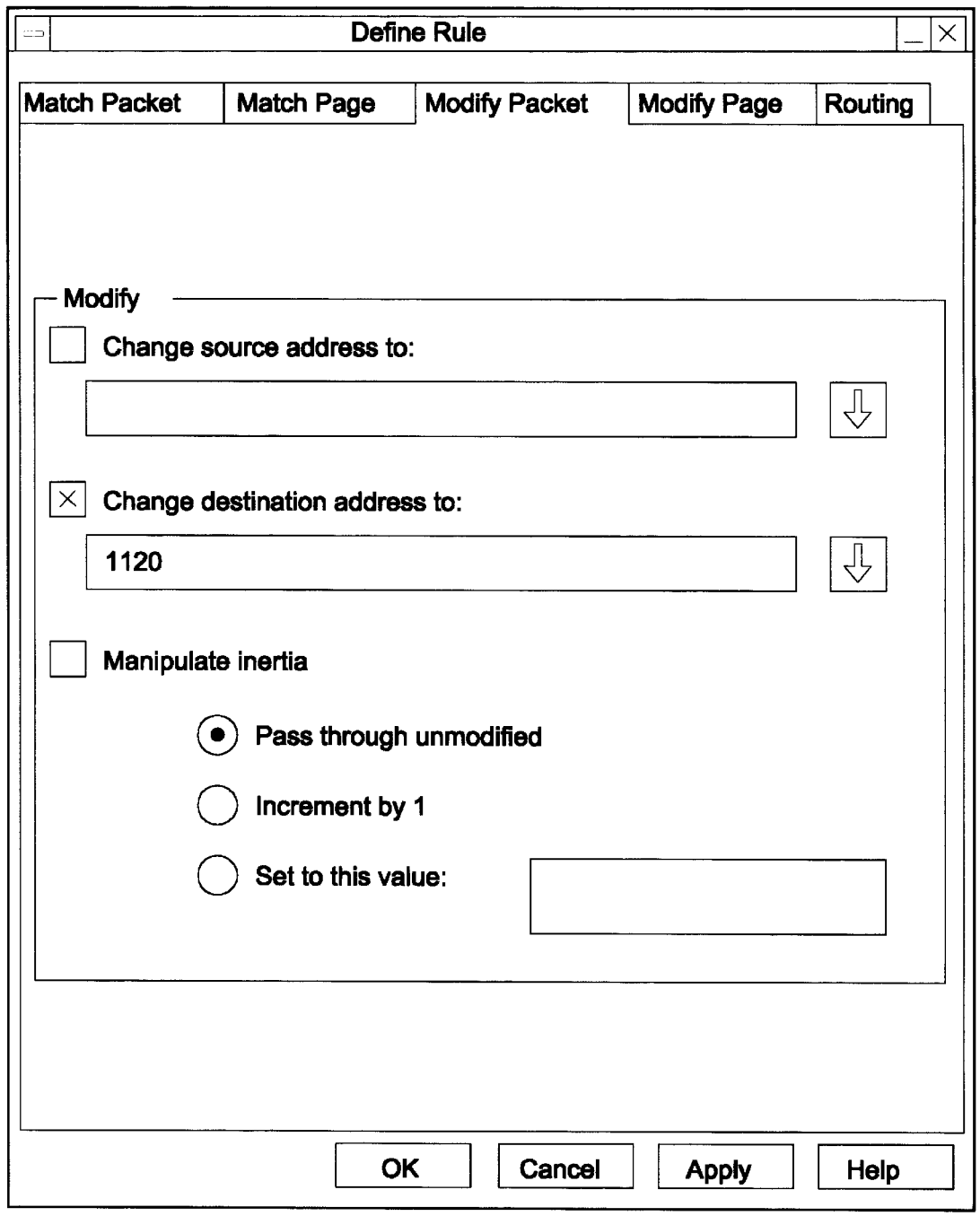
FIG. 35 shows an exemplary window for use in defining modification to be performed on a matched packet.
Figure 36:
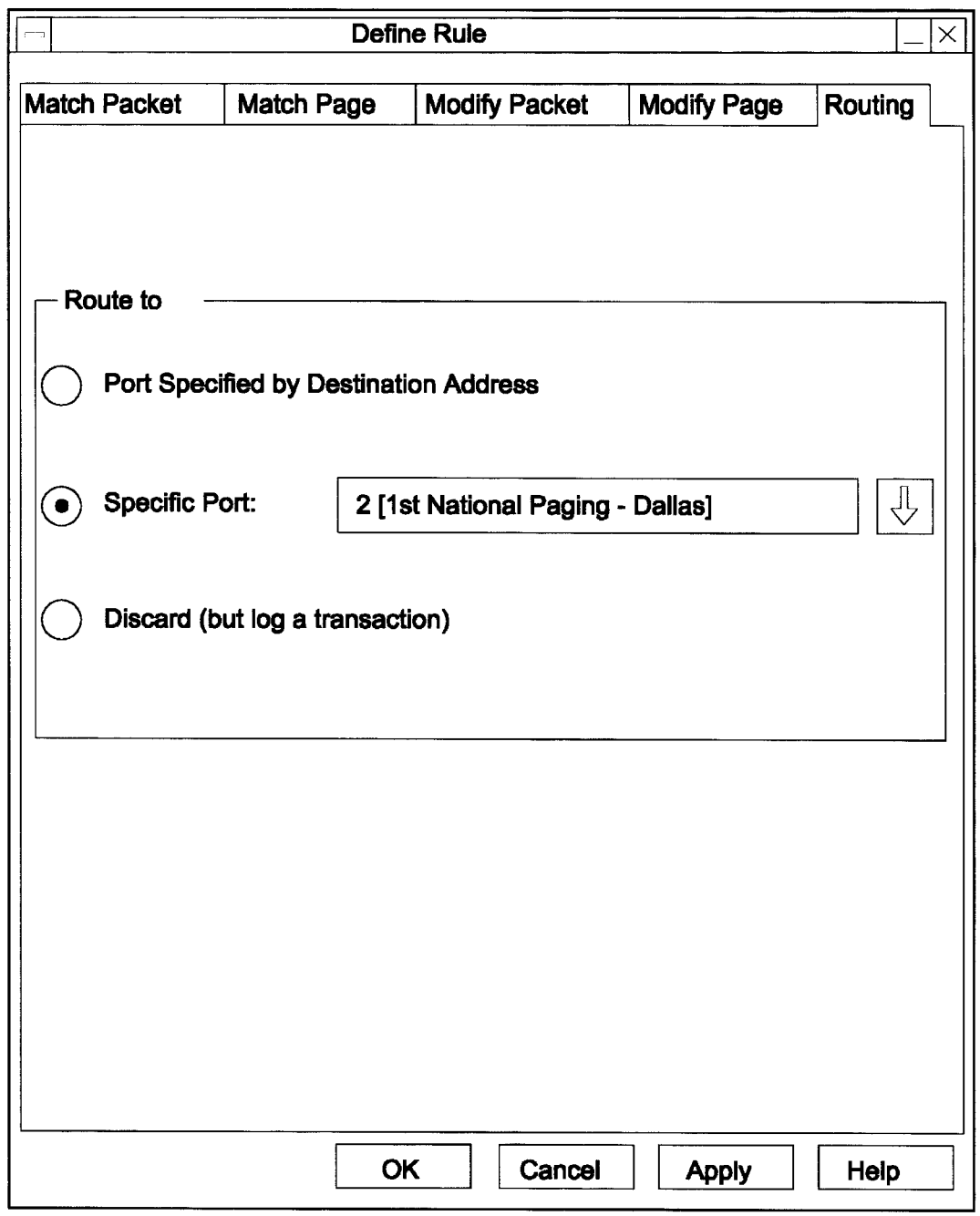
FIG. 36 shows an exemplary window for use in defining how a matched packet is routed during the forwarding process.
Figure 37:
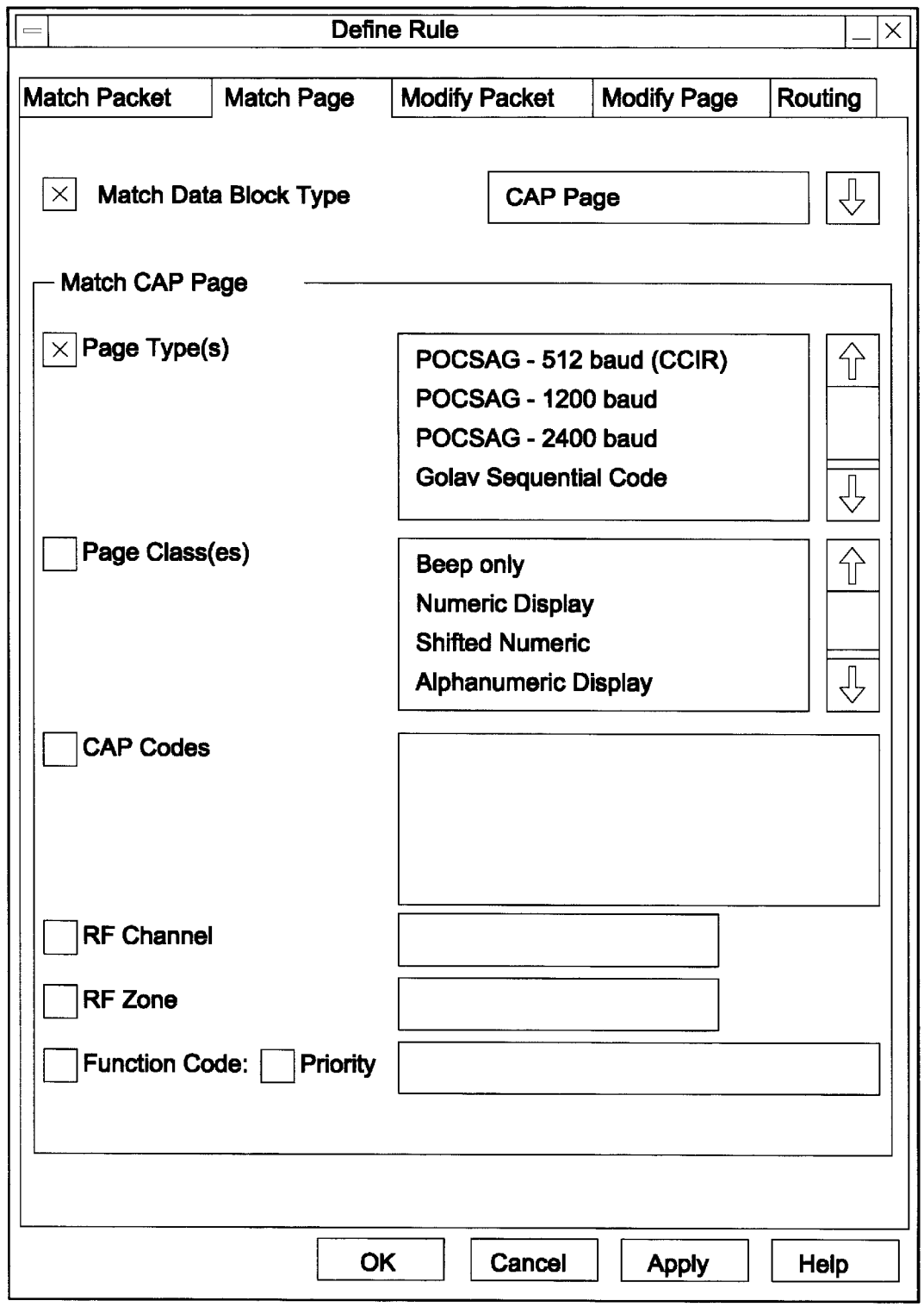
FIG. 37 shows an exemplary window for use in setting up matching conditions for specific page types.

FIG. 29 is an exemplary screen showing the main NPG window along with the first drop-down menu (the File menu), and FIGS. 30A/B show additional drop-down menus. FIG. 31 shows an exemplary address configuration window while FIG. 32 illustrates an exemplary port configuration window. FIG. 33 illustrates the rules table window as employed in the presently preferred embodiment. FIG. 34 shows an exemplary screen for defining the matching conditions for a TNPP packet, and FIG. 35 shows an exemplary screen for facilitating modification of a TNPP packet. FIG. 36 shows an exemplary screen for selecting how a packet can be routed, and FIG. 37 is an exemplary screen for facilitating setting up matching conditions.

PERFORMANCE MONITORING

Figure 38:
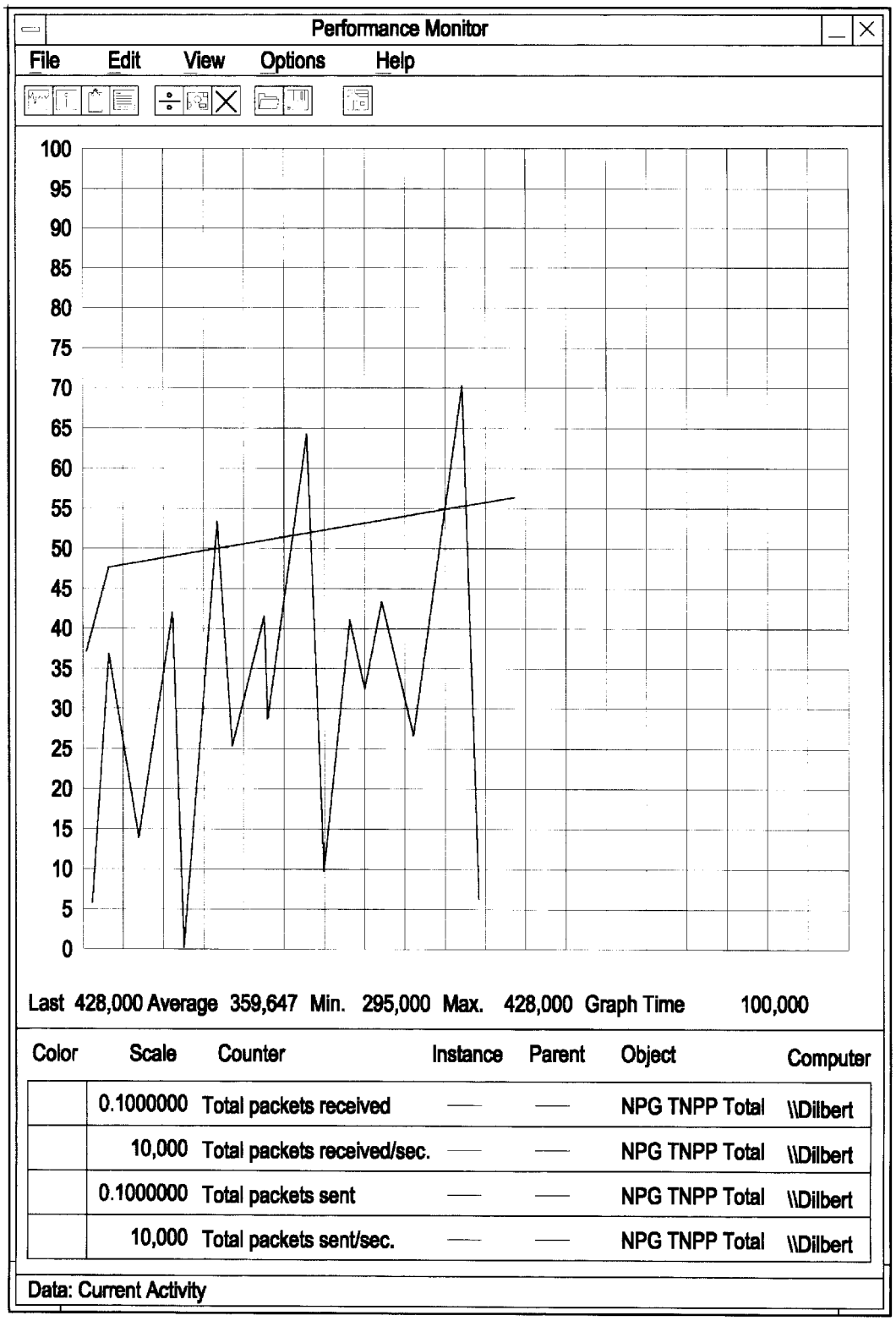
FIG. 38 shows an exemplary window for displaying performance monitoring parameters.

The NPG provides performance monitoring by interfacing with the Windows NT Performance Monitoring tool. This tool allows the user to specify what objects to monitor, how long to monitor them, etc. FIG. 38 illustrates a sample screen showing how Performance Monitor can be used to present a graphical display of activity.

For the NPG, two categories of object counters are available: TNPP Port and TNPP Total. The TNPP Port counters are provided on a per port-basis; the user can select which port to monitor any of the specific counters on. The TNPP Total counters are the sum for all TNPP ports, and can be used to get a "system" view of performance. (This is similar to the RAS Port and RAS Total objects available in the Performance Monitor when RAS is installed.)

Absolute ("raw") counters are also provided. Absolute counters are useful for setting alerts on certain thresholds.

FIG. 39 shows the rate and absolute counters provided (each within the two object categories previously mentioned) in the presently preferred embodiment.

REMOTE ACCESS

Remote access to the NPG allows a user to control the system from somewhere other than the local console. There are two approaches for achieving remote access: use the built-in Windows NT Remote Access Service (RAS) or go with a third-party commodity software application such as WinFrame™ or pcAnywhere32™. The two approaches differ in the functionality provided: RAS is a "remote node" type of connection and typical third-party applications are "remote control" connections. ("Node" in this instance refers to a node on a local-area network, not a TNPP node.)

A remote node connection essentially makes a "client" (the calling party) look like just another node on the network. Any application that can run over a network connection can be run over a remote node type of connection. A remote control connection, on the other hand, requires that the application that is being run to be on the "host" machine (in this case, the NPG), and only screen updates and keyboard commands are sent over the connection.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A process for interfacing a plurality of diverse paging networks comprising the steps of:
   A) establishing a set of rules, each rule including matching, modifying and routing elements, for identifying and handling received paging packets;
   B) determining if a received paging packet is matched to a first, matching element of one of the set of previously established rules;
   C) if, during step B), the received paging packet is matched to the first element of a given rule, modifying the received paging packet in accordance with the second element of the given rule;
   D) forwarding the modified received paging packet in accordance with the third element of the given rule; and
   E) monitoring and storing in a database a first set of predetermined aspects of each received packet.

2. The process of claim 1 in which, if during step B), the received packet is not matched to a first, matching element of any of the set of previously established rules, respectively applying second and third elements of a predetermined default rule during steps C) and D).

3. The process of claim 1 in which the set of rules is established in accordance with the Telocator Network Paging Protocol.

4. The process of claim 3 in which, if during step B), the received packet is not matched to a first, matching element of any of the set of previously established rules, respectively applying second and third elements of a predetermined default rule during steps C) and D).

5. The process of claim 1 in which, if during step B), the received packet is not matched to a first, matching element of any of the set of previously established rules, respectively applying second and third elements of a predetermined default rule during steps C) and D).

6. The process of claim 1 in which a second set of predetermined aspects of each received packet are logged in real time to provide performance and activity evaluation.

7. The process of claim 6 in which, if during step B), the received packet is not matched to a first, matching element of any of the set of previously established rules, respectively applying second and third elements of a predetermined default rule during steps C) and D).

8. The process of claim 1 which includes a user invokable step for adding new rules to the rule set after step A) has been completed.

9. The process of claim 1 which includes a user invokable step for modifying rules in the rule set after step A) has been completed.

10. The process of claim 3 which includes a user invokable step for modifying rules in the rule set after step A) has been completed.

11. The process of claim 4 which includes a user invokable step for modifying rules in the rule set after step A) has been completed.

12. The process of claim, 8 which includes a user invokable step for modifying rules in the rule set after step A) has been completed.

13. The process of claim 3 which includes a user invokable step for adding new rules to the rule set after step A) has been completed.

14. The process of claim 4 which includes a user invokable step for adding new rules to the rule set after step A) has been completed.

15. The process of claim 10 which includes a user invokable step for adding new rules to the rule set after step A) has been completed.

16. The process of claim 11 which includes a user invokable step for adding new rules to the rule set after step A) has been completed.

17. The process of claim 14 in which the set of rules is established in accordance with the Telocator Network Paging Protocol.

18. The process of claim 15 in which the set of rules is established in accordance with the Telocator Network Paging Protocol.

19. The process of claim 16 in which the set of rules is established in accordance with the Telocator Network Paging Protocol.

* * * * *